United States Patent
Fodor et al.

(10) Patent No.: US 10,194,467 B2
(45) Date of Patent: Jan. 29, 2019

(54) LISTEN-BEFORE-TALK IN UPLINK MULTIUSER MIMO SYSTEMS

(71) Applicant: Telefonaktiebolaget LM Ericsson (publ), Stockholm (SE)

(72) Inventors: Gabor Fodor, Hässelby (SE); Chrysostomos Koutsimanis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 15/241,199

(22) Filed: Aug. 19, 2016

(65) Prior Publication Data

US 2018/0054835 A1 Feb. 22, 2018

(51) Int. Cl.
*H04W 74/08* (2009.01)
*H04W 74/04* (2009.01)
(Continued)

(52) U.S. Cl.
CPC ... *H04W 74/0808* (2013.01); *H04W 72/1205* (2013.01); *H04W 74/04* (2013.01);
(Continued)

(58) Field of Classification Search
CPC ......... H04W 74/0808; H04W 72/1205; H04W 74/04; H04W 84/12; H04B 7/0452
See application file for complete search history.

(56) References Cited

U.S. PATENT DOCUMENTS

2014/0301351 A1 10/2014 Gao et al.
2016/0100396 A1 4/2016 Seok
(Continued)

FOREIGN PATENT DOCUMENTS

JP 2013118583 A 6/2013
WO 2013141672 A1 9/2013
(Continued)

OTHER PUBLICATIONS

CMCC, Discussion on issues related to UL channel access for LAA, 3GPP TSG RAN WG1 Meeting #82bis, Malmö, Sweden, Oct. 5-9, 2015, R1-155785.*

(Continued)

*Primary Examiner* — Shailendra Kumar
(74) *Attorney, Agent, or Firm* — Withrow & Terranova, PLLC

(57) ABSTRACT

Systems and methods are disclosed herein that relate to a mechanism at a radio access node(s) and a User Equipment (UE) that enable the UE to decide whether the UE can use a wireless channel for data transmission even when the UE senses the wireless channel as being busy during a listening phase of a Listen-Before-Talk (LBT) procedure. In some embodiments, the method of operation of the UE comprises performing a LBT procedure for an observed channel where a result of the LBT procedure being that the observed channel is busy and deciding to override the LBT procedure based on knowledge that the observed channel is busy due to transmission by a compatible UE and transmitting on the observed channel even though the result of the LBT procedure is that the observed channel is busy upon deciding to override the LBT procedure.

26 Claims, 24 Drawing Sheets

(51) Int. Cl.
*H04W 72/12* (2009.01)
*H04B 7/04* (2017.01)
*H04B 7/0452* (2017.01)
*H04W 84/12* (2009.01)
*H04W 74/00* (2009.01)

(52) U.S. Cl.
CPC ....... *H04W 74/0816* (2013.01); *H04B 7/0452* (2013.01); *H04W 74/006* (2013.01); *H04W 84/12* (2013.01)

(56) References Cited

U.S. PATENT DOCUMENTS

| 2017/0230986 A1* | 8/2017 | Moon | H04W 74/08 |
| 2017/0290048 A1* | 10/2017 | Amuru | H04W 72/0446 |
| 2018/0020375 A1* | 1/2018 | Matsumoto | H04W 28/06 |
| 2018/0139780 A1* | 5/2018 | Kang | H04W 72/04 |

FOREIGN PATENT DOCUMENTS

| WO | 2013164968 A1 | 11/2013 |
| WO | 2014014094 A1 | 1/2014 |
| WO | 2016027855 A1 | 2/2016 |

OTHER PUBLICATIONS

Ericsson, Discussion on LBT Protocols, 3GPP TSG RAN WG1 Meeting #80bis, Belgrade, Serbia, Apr. 20-24, 2015, R1-151996. (Year: 2015).*

Ettefagh, Azadeh et al., "Performance of a Cluster-Based MAC Protocol in Multiuser MIMO Wireless LANs," International ITG Workshop on Smart Antennas (WSA) 2010, IEEE, pp. 262-269.

CMCC, "R1-155785: Discussion on issues related to UL channel access for LAA," Third Generation Partnership Project (3GPP) TSG RAN WG1 Meeting #82bis, Oct. 5-9, 2015, 4 pages, Malmö, Sweden.

International Search Report and Written Opinion for International Patent Application No. PCT/IB2017/054827, dated Nov. 14, 2017, 16 pages.

* cited by examiner

LISTEN-BEFORE-TALK IN UPLINK MULTIUSER MIMO SYSTEMS

TECHNICAL FIELD

The present disclosure relates to Listen-Before-Talk (LBT) in an uplink Multiuser Multiple Input Multiple Output (MU-MIMO) system.

BACKGROUND

The ongoing standalone Long Term Evolution (LTE) in Unlicensed spectrum forum (MulteFire) and Third Generation Partnership Project (3GPP) Release (Rel) 14 work item on uplink License Assisted Access (LAA) allows LTE User Equipment devices (UEs) to transmit on the uplink in the unlicensed 5 gigahertz (GHz) or license-shared 3.5 GHz radio spectrum. These uplink transmissions generally need to perform Listen-Before-Talk (LBT) prior to accessing the channel.

Today, the unlicensed 5 GHz spectrum is mainly used by equipment implementing the IEEE 802.11 Wireless Local Area Network (WLAN) standard, also known under its marketing brand as "Wi-Fi."

LTE Overview

LTE uses Orthogonal Frequency Division Multiplexing (OFDM) in the downlink and Discrete Fourier Transform (DFT) spread OFDM in the uplink. The basic LTE downlink physical resource can thus be seen as a time-frequency grid as illustrated in FIG. 1, where each resource element corresponds to one OFDM subcarrier during one OFDM symbol interval.

As illustrated in FIG. 2, in the time domain, LTE downlink transmissions are organized into radio frames of 10 milliseconds (ms), each radio frame consisting of ten equally-sized subframes of length $T_{subframe}=1$ ms. For normal cyclic prefix, one subframe consists of 14 OFDM symbols. The duration of each OFDM symbol is approximately 71.4 microseconds (μs).

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled; that is, in each subframe, the base station transmits control information about which terminals' data are being transmitted and upon which resource blocks the data are being transmitted, in the current downlink subframe. This control signaling is typically transmitted in the first 1, 2, 3, or 4 OFDM symbols in each subframe and the number n=1, 2, 3, or 4 is known as the Control Format Indicator (CFI). The downlink subframe also contains common reference symbols, which are known to the receiver and used for coherent demodulation of, e.g., the control information. A downlink system with CFI=3 OFDM symbols as control is illustrated in FIG. 3.

From LTE Rel-11 onwards, the above described resource assignments can also be scheduled on the enhanced Physical Downlink Control Channel (EPDCCH). For LTE Rel-8 to Rel-10, only the Physical Downlink Control Channel (PDCCH) is available.

The reference symbols shown in FIG. 3 are the Cell specific Reference Symbols (CRSs) and are used to support multiple functions including fine time and frequency synchronization and channel estimation for certain transmission modes.

Carrier Aggregation (CA)

The LTE Rel-10 standard (and subsequent releases) supports bandwidths larger than 20 Megahertz (MHz). One important requirement on LTE Rel-10 is to assure backward compatibility with LTE Rel-8. This should also include spectrum compatibility. That would imply that an LTE Rel-10 carrier that is wider than 20 MHz should appear as a number of LTE carriers to an LTE Rel-8 terminal. Each such carrier can be referred to as a Component Carrier (CC). In particular, for early LTE Rel-10 deployments, it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of CA. CA implies that an LTE Rel-10 terminal can receive multiple CCs, where the CCs have, or at least have the possibility to have, the same structure as a LTE Rel-8 carrier. CA is illustrated in FIG. 4.

The number of aggregated CCs as well as the bandwidth of the individual CCs may be different for uplink and downlink. A symmetric configuration refers to the case where the number of CCs in downlink and uplink is the same whereas an asymmetric configuration refers to the case that the number of CCs is different. It is important to note that the number of CCs configured in a cell may be different from the number of CCs seen by a terminal. A terminal may, for example, support more downlink CCs than uplink CCs, even though the cell is configured with the same number of uplink and downlink CCs.

WLAN

In typical deployments of a WLAN, Carrier Sense Multiple Access with Collision Avoidance (CSMA/CA) is used. This means that the channel is sensed, and only if the channel is declared as Idle, a transmission is initiated. In case the channel is declared as Busy, the transmission is essentially deferred until the channel is found Idle. When the range of several Access Points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded.

A general illustration of how 802.11 stations perform CSMA/CA channel access is shown in FIG. 5. IEEE 802.11 defines a Distributed Coordination Function (DCF). The DCF coordinates the use of the medium through use of CSMA/CA and timing intervals. These timing intervals are slot time, Short Inter-Frame Space (SIFS), Distributed Inter-Frame Space (DIFS), and Extended Inter-Frame Space (EIFS). SIFS and slot time are the shortest intervals and the foundation of the others.

LAA to Unlicensed Spectrum Using LTE

Up to now, the spectrum used by LTE is dedicated to LTE. This has the advantage that the LTE system does not need to care about the coexistence issue and the spectrum efficiency can be maximized. However, the spectrum allocated to LTE is limited and, therefore, cannot meet the ever increasing demand for larger throughput from applications/services. Therefore, discussions are ongoing in 3GPP to initiate a new study item on extending LTE to exploit unlicensed spectrum in addition to licensed spectrum. Unlicensed spectrum can, by definition, be simultaneously used by multiple different technologies. Therefore, when using unlicensed spectrum, LTE would need to consider the coexistence issue with other systems such as IEEE 802.11 (Wi-Fi). Operating LTE in the same manner in unlicensed spectrum as in licensed spectrum can seriously degrade the performance of Wi-Fi as Wi-Fi will not transmit once it detects the channel is occupied.

Furthermore, one way to utilize the unlicensed spectrum reliably is to defer essential control signals and channels on a licensed carrier. That is, as shown in FIG. 6, a UE is connected to a Primary Cell (PCell) in the licensed band and one or more Secondary Cells (SCells) in the unlicensed band. In the present disclosure, a SCell in an unlicensed spectrum is referred to as a License Assisted (LA) SCell.

Standalone LTE in Unlicensed Spectrum (MulteFire)

A new industry forum has been initiated on extending LTE to operate entirely on unlicensed spectrum in a standalone mode, which is referred to as "MuLTEfire" in marketing terms. There is no licensed carrier for essential control signal transmissions and control channels. Hence, all the transmissions need to be carried on the unlicensed spectrum with no guaranteed channel access availability and also fulfill the regulatory requirements on the unlicensed spectrum.

The use of a carrier in an unlicensed spectrum should be done in a fair and equal manner for different devices. One component when securing this fair sharing is to have requirements on how to distribute transmissions over the system bandwidth. Here, two requirements are commonly found in regulations:
 1. Occupied channel bandwidth
 2. Maximum Power Spectral Density (PSD)

For example, both these requirements are enforced for 5 GHz carriers according to ETSI 301 893, while only the maximum PSD requirements are enforced in the US regulation for 5 GHz.

The occupied channel bandwidth requirement is expressed as the bandwidth containing 99% of the power of the signal, and shall be between 80% and 100% of the declared Nominal channel bandwidth. Our current understanding of this requirement is that it is tested over a time interval longer than one subframe (1 ms). The frequency allocations for one UE must thus vary between subframes in such a way that the requirement is fulfilled. It is still an open issue if this requirement needs to be fulfilled for a UE which only transmits in a single subframe, such as Physical Random Access Channel (PRACH) or with a single Physical Uplink Shared Channel (PUSCH).

Maximum PSD requirements exist in many different regions. For most cases the requirement is stated with a resolution bandwidth of 1 MHz. For example, the ETSI 301 893 specification requires 10 decibel-milliwatts (dBm)/MHz for 5150-5350 MHz. The implication of the PSD requirement on the physical layer design is that, without proper designs, a signal with small transmission bandwidth will be limited in transmission power. This can negatively affect coverage of the operation. That is, the maximum PSD requirement is a binding condition that requires changes to uplink transmissions in unlicensed spectrums.

LBT and Carrier Sensing (CS)

One key mechanism for enabling LAA-LTE, LTE in Unlicensed spectrum (LTE-U), and/or MulteFire as well as multi-operator LAA coexistence is carrier sensing or LBT. LBT governs when a radio node (e.g., an LAA radio access node or an LAA enabled UE) may access (i.e., transmit on) a channel in an unlicensed spectrum. For example, according to the European regulations CS (and the so called Clear Channel Assessment (CCA)) must be performed prior to starting a new transmission. An extended CS is performed if the channel is determined to be occupied during the CS period and transmission is postponed until the channel is considered clear.

An LBT mechanism is expected to be a major part of the specification support for LAA, LTE-U, and MulteFire. Using LAA as an example, the intermittent nature of LAA transmissions has significant implications on existing LTE functionalities such as Radio Resource Management (RRM) measurements, Automatic Gain Control (AGC) settings, coarse and fine time/frequency synchronization, and Channel State Information (CSI) measurements. Further, the benefits of LAA and LBT techniques also extend to the case where LAA networks of different operators coexist. Thus, LAA and LBT can also facilitate sharing of spectrum resources and thereby reduce the cost for individual operators and increasing the spectrum utilization.

Multiuser Multiple Input Multiple Output (MU-MIMO) Systems, Spatial Multiplexing, and Co-Scheduling MU-MIMO technology utilizes multiple antennas at the transmitter and/or receiver to spatially multiplex multiple data streams on the same or overlapping time and frequency resource. This capability can be used to allow a distinct UE to transmit and receive separate data streams to/from a central radio access node such as a LTE enhanced or evolved Node B (eNB). When used for uplink transmission, MU-MIMO is sometimes also referred to as "virtual MIMO" since the multiple spatially co-scheduled UEs, each potentially equipped with only a single transmit antenna, can effectively form a MIMO system similar to a single device equipped with multiple transmit antennas, the difference being that in MU-MIMO the different transmit antennas may belong to distinct UEs.

MU-MIMO is attractive because it can take advantage of the spatial separation of multiple UEs and multiple data streams and can thereby increase the spectral efficiency of cellular systems. Thus, MU-MIMO can also facilitate the reuse of a Physical Resource Block (PRB) at the expense of some increase of intra-cell interference. However, advanced MU-MIMO receivers can suppress such interference by utilizing the spatial separation of the co-scheduled UEs, depending on the number of receive antennas, available CSI at the Receiver (CSIR), propagation conditions (multipath components), received power difference between users (near-far effect), and other factors.

It follows that in MU-MIMO systems a major design issue is the Medium Access Control (MAC) layer that allows for selecting the group of UEs that share a set of PRBs at a given point in time. Such UE grouping or MU-MIMO scheduling is typically outside the scope of the standards, but forms an important proprietary part of MU-MIMO systems.

An issue arises in that a conventional distributed MAC based on LBT schemes is incompatible with spatial multiplexing (i.e., MU-MIMO) techniques.

SUMMARY

Systems and methods are disclosed herein that relate to a mechanism at a radio access node(s) and a User Equipment (UE) that enable the UE to decide whether the UE can use a wireless channel for data transmission even when the UE senses the wireless channel as being busy during a listening phase of a Listen-Before-Talk (LBT) procedure. When spatial multiplexing of Multiuser Multiple Input Multiple Output (MU-MIMO) UEs is supported at the radio access node, the LBT procedure is made, by means of the embodiments disclosed herein, compatible with spatial domain co-scheduling. The embodiments of the present disclosure, therefore, enable MU-MIMO co-scheduling in unlicensed bands when MU-MIMO technology is deployed in such bands.

Embodiments of a method of operation of a UE in a cellular communications network are disclosed. In some embodiments, the method of operation of the UE comprises performing a LBT procedure for an observed channel where a result of the LBT procedure being that the observed channel is busy and deciding to override the LBT procedure based on knowledge that the observed channel is busy due to transmission by a compatible UE. The compatible UE is a UE that can be co-scheduled with the UE in the cellular communications network using, e.g., a spatial multiplexing technique such as, e.g., MU-MIMO. The method further comprises transmitting on the observed channel even though the result of the LBT procedure is that the observed channel is busy upon deciding to override the LBT procedure.

In some embodiments, the method of operation of the UE further comprises receiving, from a radio access node, an indication that the UE is permitted to override the LBT procedure if the observed channel is busy due to transmission by a compatible UE. Further, deciding to override the LBT procedure comprises deciding to override the LBT procedure based on the indication. In some embodiments, the method further comprises receiving a revocation of the indication while transmitting on the observed channel, and terminating transmission on the observed channel upon receiving the revocation of the indication.

In some embodiments, the method of operation of the UE further comprises obtaining identities of one or more UEs transmitting on the observed channel. Further, deciding to override the LBT procedure comprises deciding to override the LBT procedure if the identities of the one or more UEs transmitting on the observed channel are all compatible UEs.

In some embodiments, the method of operation of the UE further comprises receiving, from a radio access node, a compatibility vector comprising identities of one or more compatible UEs for the UE, receiving, from the radio access node, an indication that the UE is permitted to override the LBT procedure if the observed channel is busy due to transmission by a compatible UE as identified in the compatibility vector, and obtaining identities of one or more UEs transmitting on the observed channel. Further, deciding to override the LBT procedure comprises deciding to override the LBT procedure based on the indication, the compatibility vector, and the identities of the one or more UEs transmitting on the observed channel. Still further, in some embodiments, deciding to override the LBT procedure based on the indication, the compatibility vector, and the identities of the one or more UEs transmitting on the observed channel comprises deciding to override the LBT procedure if: (a) the indication has been received and (b) the identities of the one or more UEs transmitting on the observed channel are all included in the compatibility vector.

In some embodiments, the method of operation of the UE further comprises receiving, from a radio access node, an indication that the UE is permitted to override the LBT procedure if the observed channel is busy due to transmission by one or more compatible UEs and UE identities of the one or more compatible UEs comprised in the indication, and obtaining identities of one or more UEs transmitting on the observed channel. Further, deciding to override the LBT procedure comprises deciding to override the LBT procedure based on the indication and the identities of the one or more UEs transmitting on the observed channel. Still further, in some embodiments, deciding to override the LBT procedure based on the indication and the identities of the one or more UEs transmitting on the observed channel comprises deciding to override the LBT procedure if: (a) the indication has been received and (b) the identities of the one or more UEs transmitting on the observed channel are all comprised in the indication.

In some embodiments, the method of operation of the UE further comprises receiving, from a radio access node, a compatibility vector comprising identities of one or more compatible UEs for the UE and obtaining identities of one or more UEs transmitting on the observed channel. Further, deciding to override the LBT procedure comprises deciding to override the LBT procedure based on the compatibility vector and the identities of the one or more UEs transmitting on the observed channel. Still further, in some embodiments, deciding to override the LBT procedure based on the compatibility vector and the identities of the one or more UEs transmitting on the observed channel comprises deciding to override the LBT procedure if the identities of the one or more UEs transmitting on the observed channel are all comprised in the compatibility vector.

In some embodiments, the method of operation of the UE further comprises receiving, from a radio access node, an indication that the UE is permitted to override the LBT procedure. Further, deciding to override the LBT procedure comprises deciding to override the LBT procedure upon receiving the indication.

In some embodiments, the observed channel is in an unlicensed frequency band.

Embodiments of a UE for a cellular communications network are also disclosed. In some embodiments, the UE comprises at least one transceiver, at least one processor, and memory comprising instructions executable by the at least one processor whereby the UE is operable to perform a LBT procedure for an observed channel where, a result of the LBT procedure being that the observed channel is busy, decide to override the LBT procedure based on knowledge that the observed channel is busy due to transmission by a compatible UE, and transmit on the observed channel even though the result of the LBT procedure is that the observed channel is busy upon deciding to override the LBT procedure. The compatible UE being a UE that can be co-scheduled with the UE in the cellular communications network.

In some embodiments, a UE for a cellular communications network is adapted to perform a LBT procedure for an observed channel, a result of the LBT procedure being that the observed channel is busy. The UE is further adapted to decide to override the LBT procedure based on knowledge that the observed channel is busy due to transmission by a compatible UE, the compatible UE being a UE that can be co-scheduled with the UE in the cellular communications network. The UE is further adapted to transmit on the observed channel even though the result of the LBT procedure is that the observed channel is busy upon deciding to override the LBT procedure.

In some embodiments, a UE for a cellular communications network comprises a LBT module, a deciding module, and a transmitting module. The LBT module is operable to perform a LBT procedure for an observed channel, a result of the LBT procedure being that the observed channel is busy. The deciding module is operable to decide to override the LBT procedure based on knowledge that the observed channel is busy due to transmission by a compatible UE, the compatible UE being a UE that can be co-scheduled with the UE in the cellular communications network. The transmitting module is operable to transmit on the observed channel even though the result of the LBT procedure is that the observed channel is busy upon deciding to override the LBT procedure.

Embodiments of a method of operation of a node (e.g., a radio access node or a processing node in a virtualized radio access node) in a cellular communications network are also disclosed. In some embodiments, the method of operation of the node comprises providing an indication to a UE, where the indication indicates that the UE is permitted to override a LBT procedure for an observed channel if the observed channel is busy due to transmission by a compatible UE. The compatible UE is a UE that can be co-scheduled with the UE in the cellular communications network.

In some embodiments, the method of operation of the node further comprises transmitting a Channel Clearance Indicator (CCI) message to the UE in response to the compatible UE transmitting on the observed channel.

In some embodiments, the method of operation of the node further comprises receiving reference signals from a plurality of UEs comprising the UE and generating a compatibility matrix, e.g., based on the reference signals. The capability matrix comprises, for each UE of the plurality of UEs, a compatibility vector that comprises information that indicates which of the other UEs in the plurality of UEs are compatible UEs for that UE. The method further comprises sending, to the UE, the compatibility vector for the UE.

In some embodiments, the method of operation of the node further comprises receiving reference signals from a plurality of UEs comprising the UE and generating a compatibility matrix, e.g., based on the reference signals. The capability matrix comprises, for each UE of the plurality of UEs, a compatibility vector that comprises information that indicates which of the other UEs in the plurality of UEs are compatible UEs for that UE. Providing the indication to the UE comprises transmitting a CCI message to the UE in response to the compatible UE, as determined by the compatibility matrix, transmitting on the observed channel.

In some embodiments, the method of operation of the node further comprises providing the indication to a second UE and revoking the indication to the second UE in response to the UE transmitting on the observed channel. Further, in some embodiments, the second UE is compatible with the compatible UE, and the second UE is not compatible with the UE. Further, in some embodiments, the method further comprises revoking the indication to the UE while the UE is transmitting. Further, in some embodiments, the method further comprises renewing the indication to the second UE upon revoking the indication to the UE.

In some embodiments, the method of operation of the node further comprises providing the indication to a second UE once the UE has completed a transmission on the observed channel, wherein the second UE is compatible with the compatible UE, and the second UE is not compatible with the UE. Further, in some embodiments, the method further comprises revoking the indication to the UE once the UE has completed the transmission on the observed channel.

In some embodiments, the method of operation of the node further comprises receiving information from a neighboring radio access node in the cellular communications network that indicates that the compatible UE is compatible with the UE, the compatible UE being served by the neighboring radio access node. Further, in some embodiments, the information received from the neighboring radio access node comprises at least one of a group consisting of: an indication that the compatible UE is in a cell served by the neighboring radio access node, an indication that the compatible UE is in a handover zone between the cell served by the neighboring radio access node and a cell served by the radio access node, and information regarding a radio channel between the radio access node and the compatible UE.

Embodiments of a node for a cellular communications network are also disclosed. In some embodiments, the node for the cellular communications network comprises at least one processor and memory comprising instructions executable by the at least one processor whereby the node is operable to provide an indication to a UE where the indication indicates that the UE is permitted to override a LBT procedure for an observed channel if the observed channel is busy due to transmission by a compatible UE. The compatible UE being a UE that can be co-scheduled with the UE in the cellular communications network.

In some embodiments, a node for a cellular communications network is adapted to provide an indication to a UE where the indication indicates that the UE is permitted to override a LBT procedure for an observed channel if the observed channel is busy due to transmission by a compatible UE. The compatible UE being a UE that can be co-scheduled with the UE in the cellular communications network.

In some embodiments, a node for a cellular communications network comprises an indication providing module operable to provide an indication to a UE where the indication indicates that the UE is permitted to override a LBT procedure for an observed channel if the observed channel is busy due to transmission by a compatible UE. The compatible UE being a UE that can be co-scheduled with the UE in the cellular communications network.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
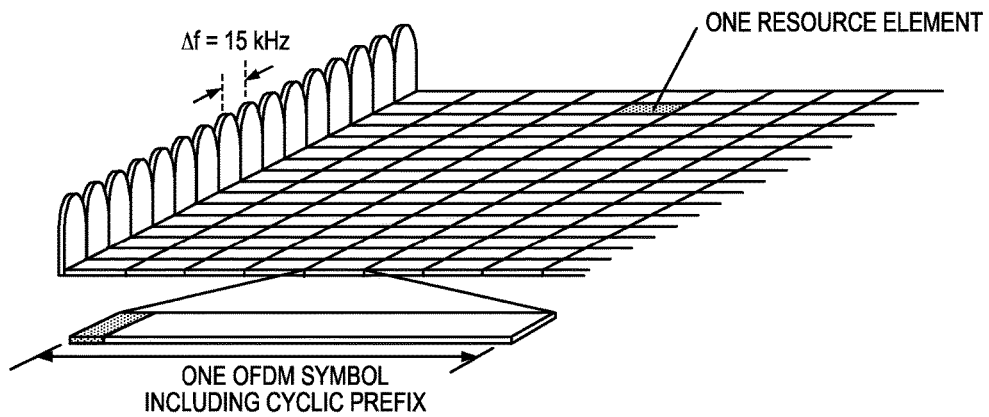
FIG. 1 illustrates the basic Long Term Evolution (LTE) downlink physical resource.
Figure 2:
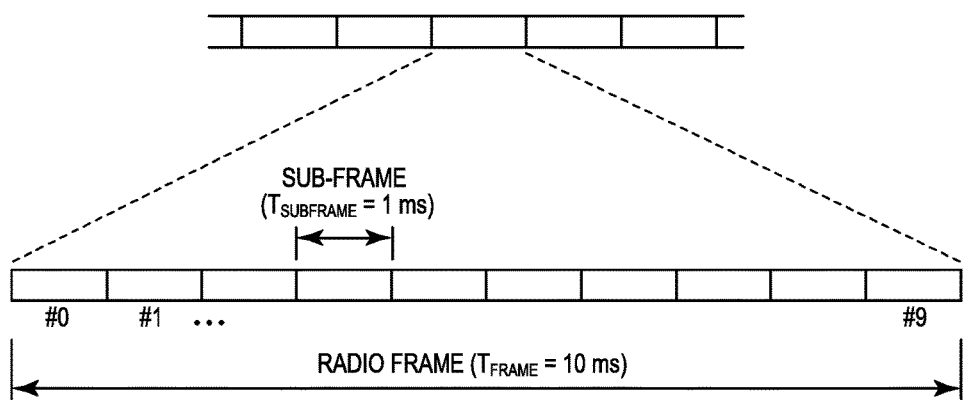
FIG. 2 illustrates a LTE downlink radio frame.
Figure 3:
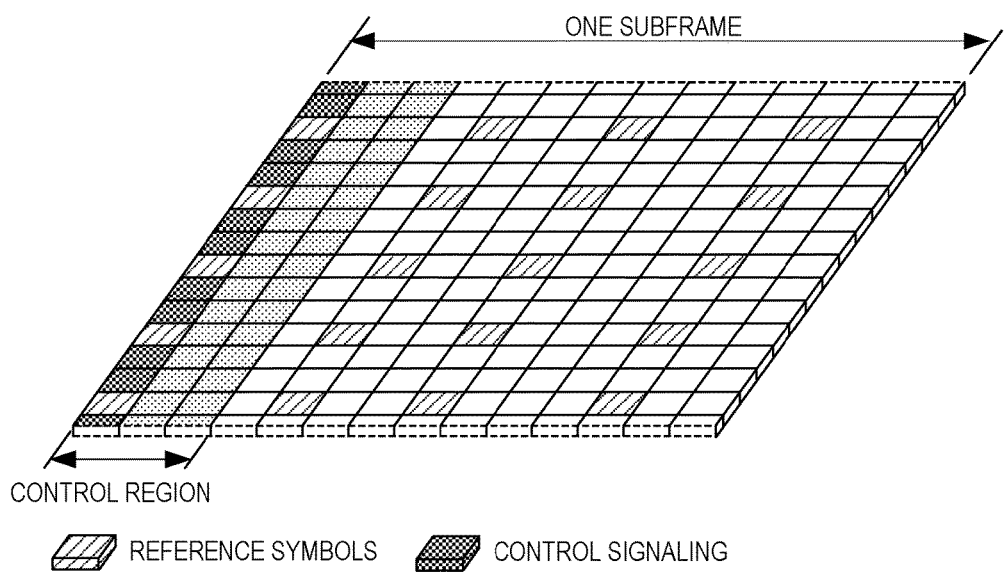
FIG. 3 illustrates an example LTE downlink subframe.
Figure 4:
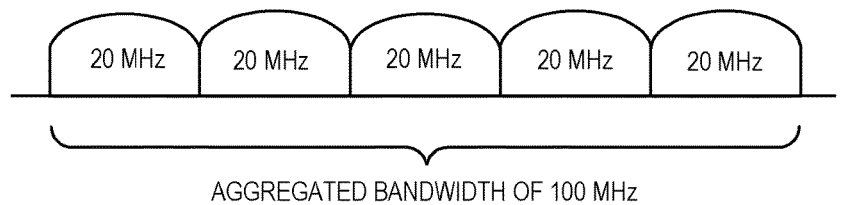
FIG. 4 illustrates Carrier Aggregation (CA)
Figure 5:
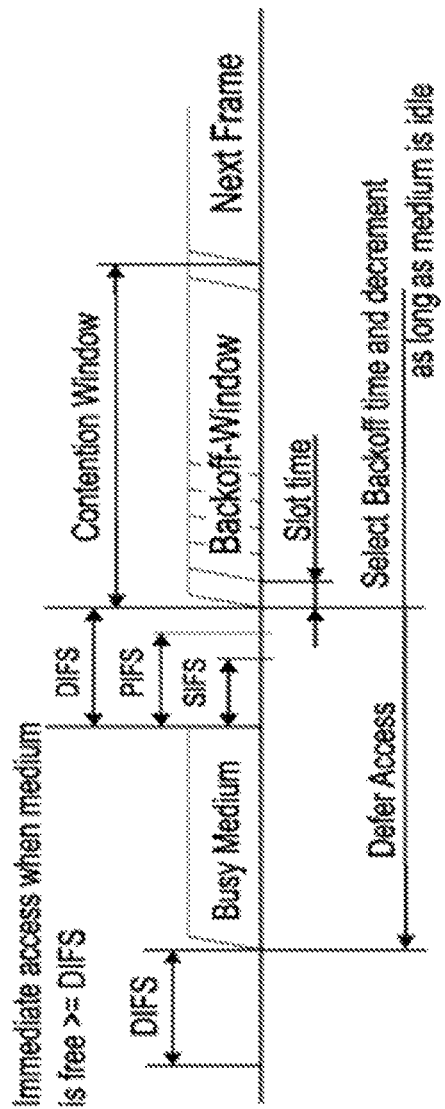
FIG. 5 is a general illustration of Carrier Sense Multiple Access with Collision Avoidance (CSMA/CA) channel access.
Figure 6:
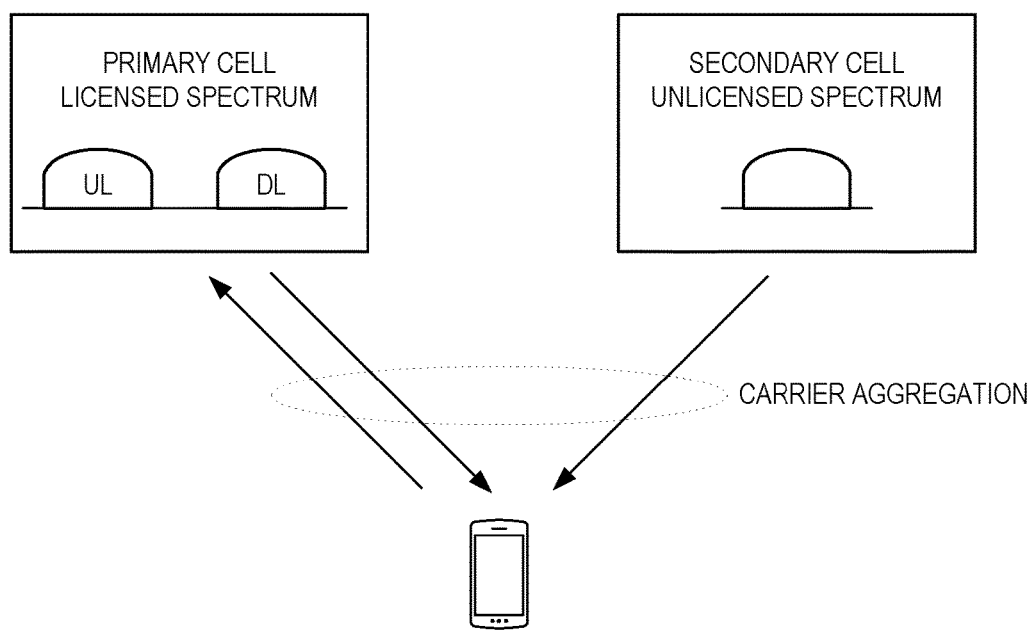
FIG. 6 illustrates License Assisted Access (LAA) to unlicensed spectrum using LTE.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

User Equipment (UE): As used herein, the term UE and "wireless device" are used interchangeably to refer to any type of device that has access to (i.e., is served by) a cellular communications network by wirelessly transmitting and/or receiving signals to a radio access node(s).

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

Before describing embodiments of the present disclosure, a brief description of a problem that arises when using conventional Listen-Before-Talk (LBT), or carrier sensing, schemes as a distributed Medium Access Control (MAC) mechanism for a cellular communications network operating in an unlicensed frequency spectrum is beneficial. In particular, the systems and methods described herein apply to scenarios in which UEs employ LBT as a distributed MAC mechanism. A respective radio access node (e.g., a base station or eNB) may be equipped with multiple receive antennas and employs a Multiuser Multiple Input Multiple Output (MU-MIMO) receiver to enable spatial multiplexing of UEs on the same or overlapping time and frequency resources. In these scenarios, one problem is that UEs tend to sense the channel as being "busy" when there is at least one or possibly multiple other UEs transmitting to a given radio access node utilizing spatial multiplexing. Consequently, if using conventional LBT schemes, such a UE refrains from uplink data transmission and backs off according to the LBT scheme even though the UE could transmit by utilizing the spatial multiplexing and de-multiplexing capability at the radio access node. As a result, the spectral efficiency of the system is severely degraded as compared with a full spatial multiplexing case, in which multiple UEs are co-scheduled. Fundamentally, the problem is an incompatibility between spatial multiplexing (MU-MIMO) and a distributed MAC based on LBT schemes.

The present disclosure relates to LBT, or carrier sensing, schemes that are compatible with spatial multiplexing (e.g., MU-MIMO). In general, systems and methods are disclosed herein that enable a UE to override an LBT procedure performed on an observed channel when the observed channel is determined to be busy due to transmission by one or more compatible UEs.

Figure 7:
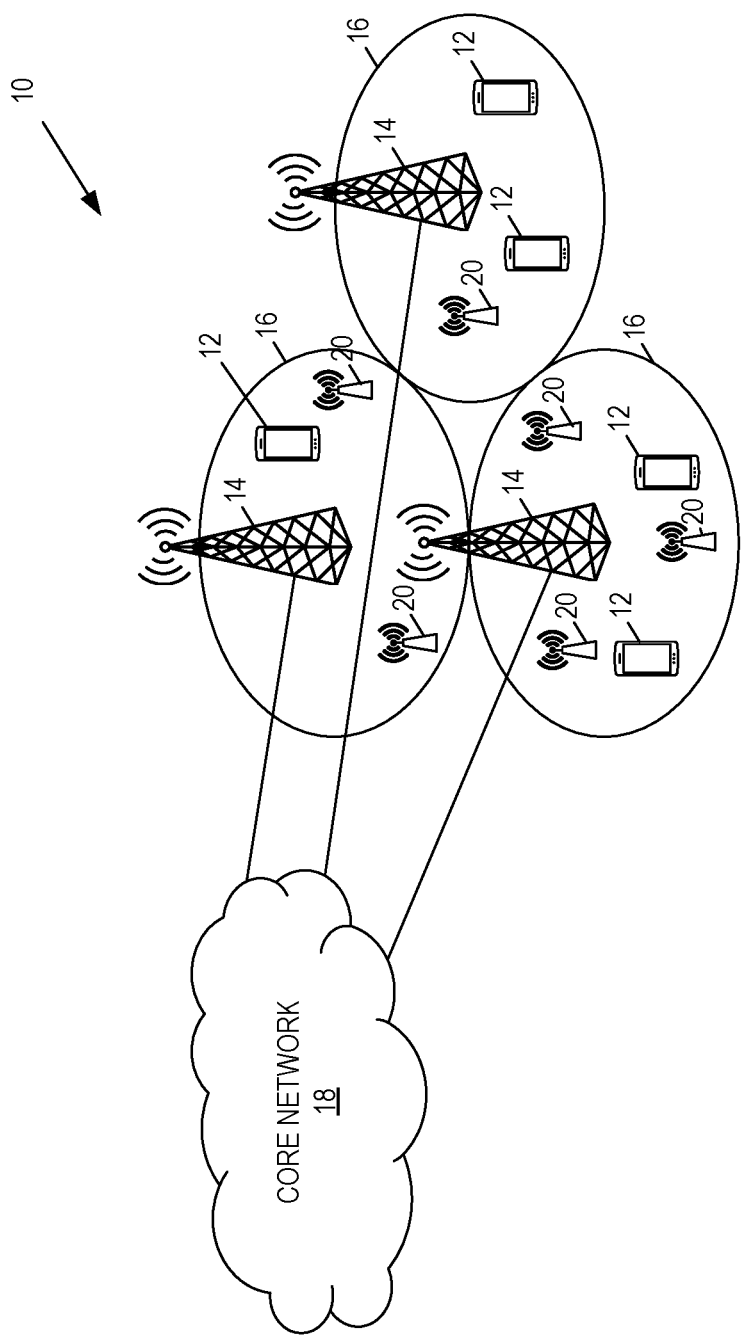
FIG. 7 illustrates one example of a cellular communications network, or more generally a wireless system, in which embodiments of the present disclosure may be implemented.

In this regard, FIG. 7 illustrates one example of a cellular communications network 10, or more generally a wireless system, in which embodiments of the present disclosure may be implemented. As illustrated, the cellular communications network 10 provides wireless access to a number of UEs 12, which are also referred to herein as wireless devices. The cellular communications network 10 includes a radio access network, which includes a number of radio access nodes 14 (e.g., base stations such as, e.g., eNBs) serving corresponding cells 16. The radio access nodes 14 are connected to a core network 18.

At least some of the radio access nodes 14 provide cells in an unlicensed frequency spectrum. For example, at least some of the radio access nodes 14 operate in an unlicensed frequency spectrum according to an appropriate technology such as, for example, License Assisted Access LTE (LAA-LTE), LTE in Unlicensed Spectrum (LTE-U), or LTE in Unlicensed Spectrum Forum (MulteFire). Access points 20 for other radio access technologies (e.g., Wi-Fi) also operate in the same unlicensed frequency spectrum. As such, when the UEs 12 operate in the respective cells, the UEs 12 must perform a LBT procedure before transmitting on the uplink. Likewise, the radio access nodes 14 must also perform a LBT procedure before transmitting on the downlink.

Importantly, the radio access nodes 14 are capable of performing spatial de-multiplexing to enable reception of uplink transmissions from multiple UEs on the same or overlapping time and frequency resources according to, e.g., a MU-MIMO scheme. As described below, sets of compatible UEs (i.e., sets of UEs that can be spatially multiplexed, i.e., co-scheduled on the same or overlapping time and frequency resources) are identified. Using this information, the radio access nodes 14 utilize a signaling mechanism to enable a UE 12 to decide whether or not it is allowed to override the LBT procedure (i.e., allowed to transmit) when the UE 12 senses the observed channel as being busy as part of the LBT procedure.

As used herein, "compatible UEs" or "compatible wireless devices" are UEs or wireless devices that can be co-scheduled using a spatial multiplexing scheme (e.g., MU-MIMO). That is, compatible UEs can form MU-MIMO sets that use the same or overlapping time-frequency resources and can be separated in the spatial domain. In the uplink, such MU-MIMO spatial multiplexing is made possible by acquiring Channel State Information (CSI) at the Receiver (CSIR) and employing multiuser receivers, such as Minimum Mean Square Error (MMSE) or Interference Rejection Combining (IRC) receivers, Successive Interference Cancellation (SIC) receivers and/or combinations of these type of receiver structures.

The radio access node 14 continuously collects measurement results reported by the served UEs 12 and, based on these measurement results, maintains a compatibility matrix that associates the set of UEs 12 that are feasible for co-scheduling with each given UE 12. In some embodiments, based on the compatibility matrix, the radio access node 14 informs the UEs 12 by means of a Channel Clearance Indicator (CCI) message whether those UEs 12 are allowed to start transmitting even if they sense the channel busy when performing the carrier sensing ("listening") phase of their respective LBT procedures. In some embodiments, the UEs 12, in turn, use the CCI messages to maintain a set of UEs with which they can be co-scheduled. The UEs 12 can use this information, e.g., in deciding whether they can start data transmission or should back-off if the channel is sensed busy during the LBT procedure. The exact behavior at the UE side depends on whether the UE 12 can determine the identity of the specific UE(s) that are transmitting at the time of channel sensing.

Figure 8:
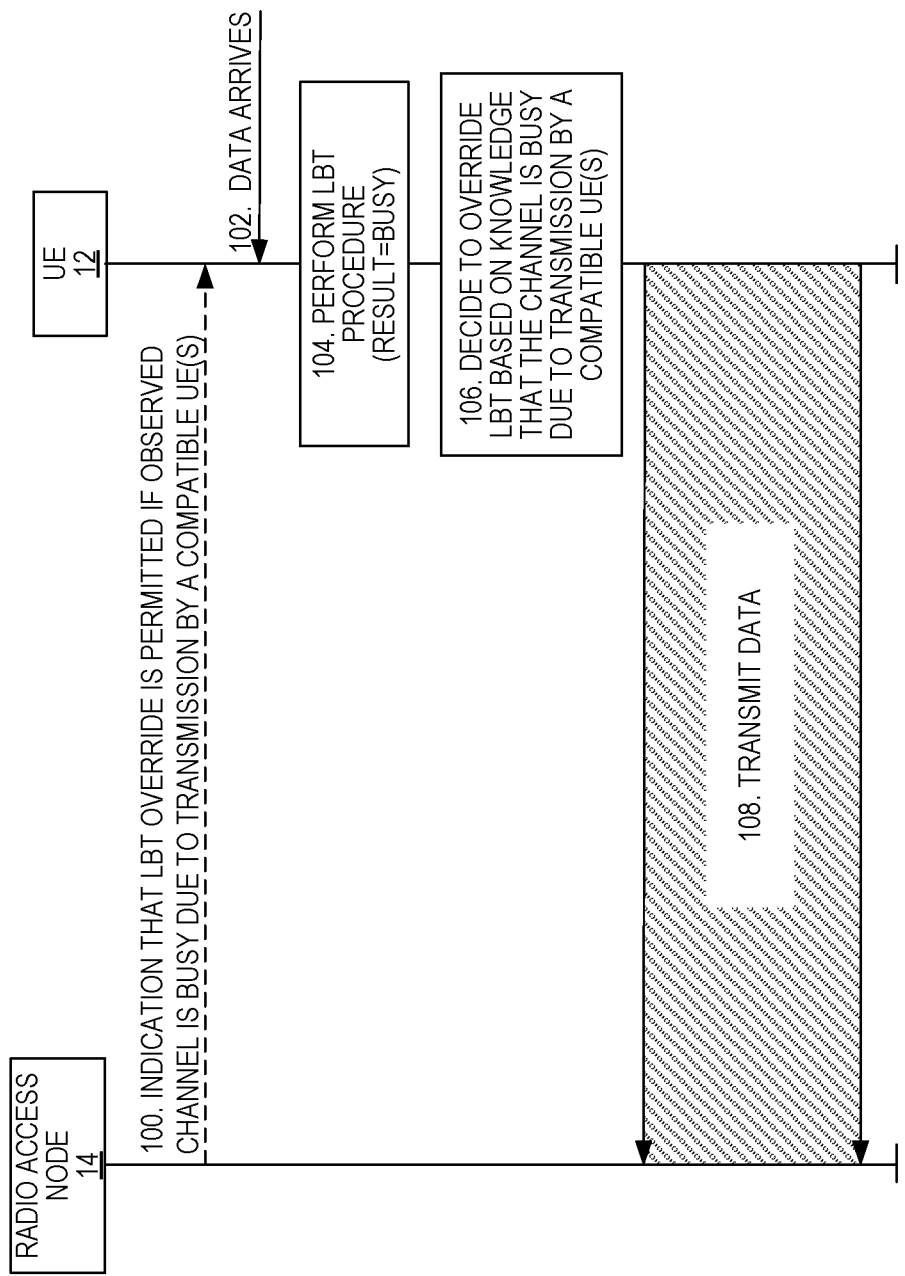
FIG. 8 illustrates the operation of a radio access node and a User Equipment device (UE) to enable Listen-Before-Talk (LBT) override according to some embodiments of the present disclosure.

FIG. 8 illustrates the operation of a radio access node 14 and a UE 12 to enable LBT override according to some embodiments of the present disclosure. Optional steps are indicated by dashed lines. Further, while the steps are illustrated as being performed in a particular order, the steps may be performed in any desired order unless explicitly stated or otherwise required. Further, some steps may be performed concurrently with one another.

As illustrated, the radio access node 14 optionally transmits an indication to the UE 12, where the indication is an indication that LBT override is permitted if an observed channel is busy due to transmission by a compatible UE(s) (step 100). The observed channel is a channel in an unlicensed frequency spectrum or some channel that requires LBT. As discussed in detail below, in some embodiments, the indication is a CCI message. Further, in some embodiments, the CCI message is a general indication that LBT override is permitted. In other embodiments, the CCI message includes Identifiers (IDs), or identities, (e.g., UE IDs) of one or more UEs 12 that are compatible with the UE 12.

At some point, data arrives at the UE 12 for transmission (step 102). The UE 12 performs an LBT procedure (step 104). In this example, during the LBT procedure, the UE 12 determines that the observed channel is busy. The UE 12 decides to override the LBT procedure based on knowledge that the observed channel is busy due to transmission by a compatible UE(s) (step 106). For example, in some embodiments, the UE 12 obtains: (a) the identity(ies) of the UE(s) 12 that are transmitting on the observed channel by, e.g., monitoring the observed channel for UE IDs contained in preambles of transmissions on the observed channel by other UE(s) 12 and (b) the identity(ies) of other UEs 12 that are compatible with the UE 12 (i.e., the identities of compatible UEs 12). If all of the UE(s) 12 that are transmitting on the observed channel are compatible with the UE 12, the UE 12 decides to override the LBT procedure. In this example, the UE 12 decides to override the LBT procedure and, as such, the UE 12 transmits data to the radio access node 14 on the observed channel (step 108).

FIGS. 9A and 9B through FIGS. 15A and 15B illustrate various embodiments of the present disclosure in which the UEs 12 are able to obtain the identities of the UEs 12 that are transmitting on the channel. The UEs 12 may obtain the identities of the UEs 12 from a network node (e.g., the radio access node 14) or may determine the identities of the UEs 12 by, e.g., monitoring transmissions on the channel. The identities of the UEs 12 are referred to herein as UE IDs.

Figure 9A:
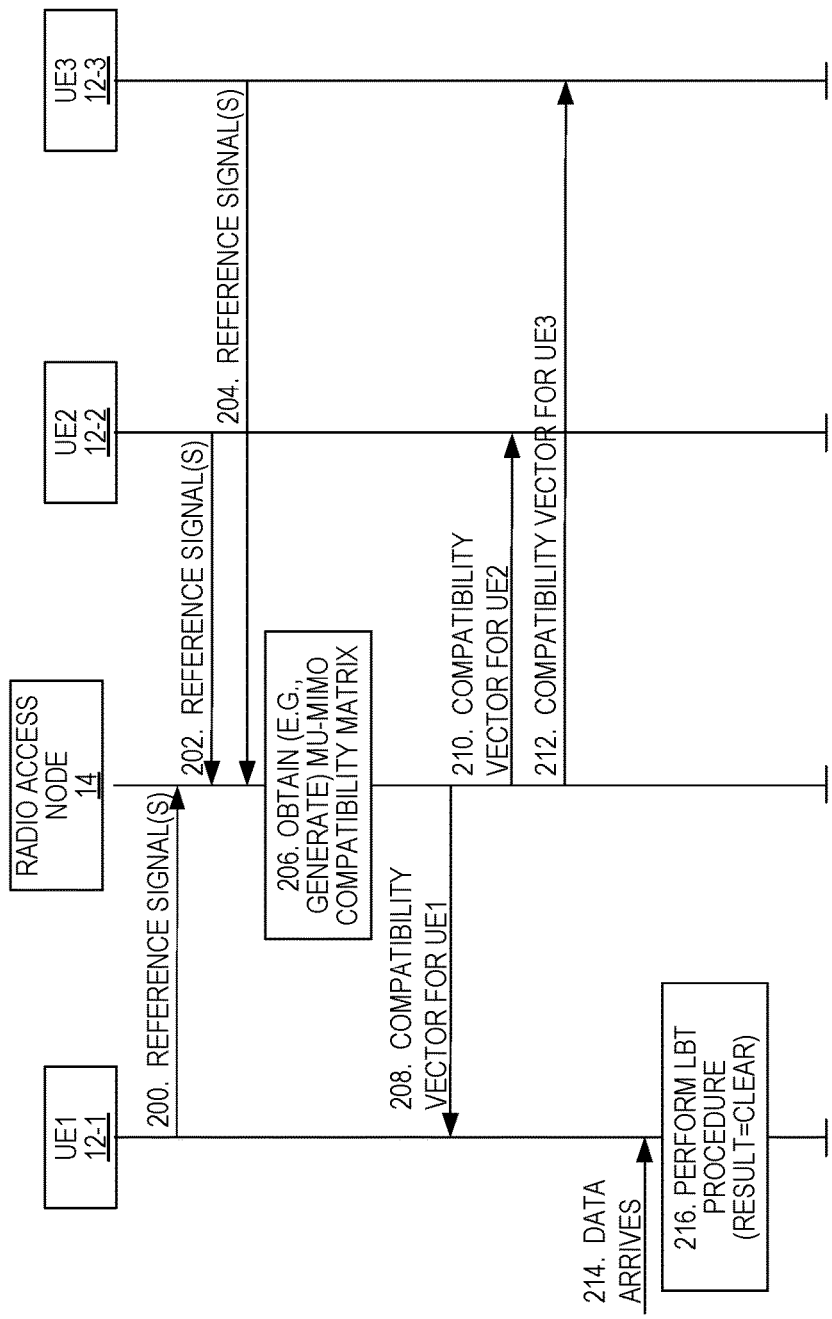
FIGS. 9A and 9B illustrate the operation of a number of UEs and a radio access node to provide LBT override according to some embodiments of the present disclosure.
Figure 9B:
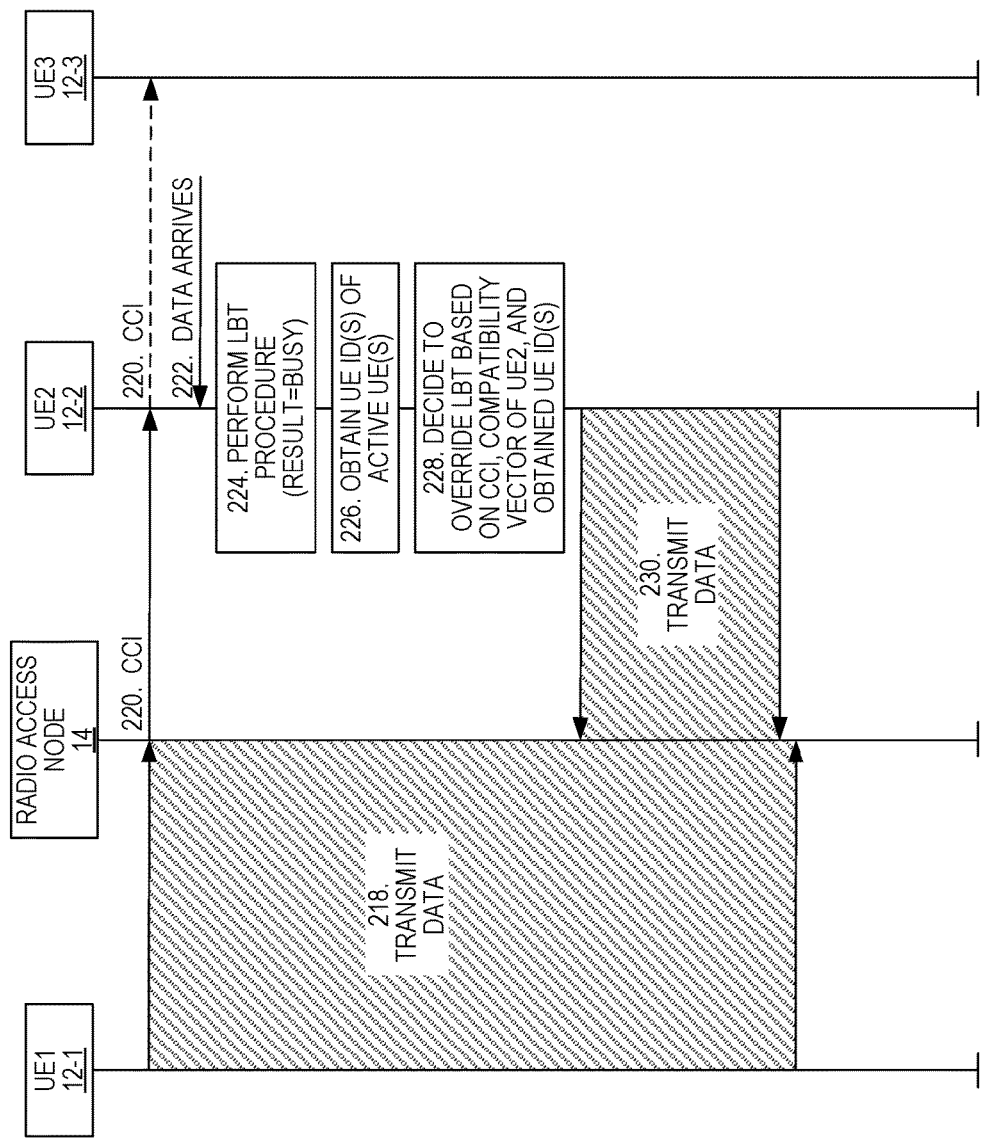

FIGS. 9A and 9B illustrate the operation of a number of UEs 12 (UE1, UE2, and UE3, which are referenced as UE 12-1, UE 12-2, and UE 12-3, respectively) and the radio access node 14 according to some embodiments of the present disclosure. In particular, FIGS. 9A and 9B illustrate one example variation or implementation of the process of FIG. 8. Importantly, in this example, both the UE 12-2 and the UE 12-3 are compatible with the UE 12-1 (i.e., the UE 12-2 and the UE 12-3 are or are in the set of compatible UEs for the UE 12-1), but the UE 12-2 and the UE 12-3 are non-compatible UEs (i.e., the UE 12-3 is not in the set of compatible UEs for the UE 12-2 and the UE 12-2 is not in the set of compatible UEs for UE the 12-3). The radio access node 14 has MU-MIMO capabilities (e.g., spatial de-multiplexing capabilities).

The UEs 12-1, 12-2, and 12-3 transmit reference signals to the radio access node 14, e.g., as part of a channel estimation process (steps 200-204). The UEs 12-1, 12-2, and 12-3 may transmit the reference signals periodically or non-periodically, e.g., when transmitting data or when requested by the radio access node 14, depending on the implementation. In LTE, such reference signals are the Demodulation Reference Signals (DMRSs) and Sounding Reference Signals (SRSs) that enable the radio access node 14 (eNB) to acquire CSIR for signal demodulation and multiuser scheduling purposes.

Based on the reception of the reference signals, the radio access node 14 can draw conclusions on the spatial channel characteristics of each UE 12. If the UEs 12 are spatially uncorrelated (separated) enough, then based on the massive MIMO receiver capabilities of the radio access node 14, multiple UEs 12 can be co-scheduled for simultaneous uplink transmission. In the example scenario, the UE 12-1 is spatially separated from (and, therefore, compatible with) both the UE 12-2 and the UE 12-3. In other words, the UE 12-1 can be co-scheduled with the UE 12-2 or the UE 12-3 and can still be decoded by the radio access node 14 successfully by forming two non-overlapping beams due to the spatial characteristics of the channel. On the other hand, the UE 12-2 and the UE 12-3 are considered to be non-spatially separated (or non-compatible), meaning that the radio access node 14 cannot co-schedule both the UE 12-2 and the UE 12-3. If it did, it would lead to excessive mutual interference which deteriorates the signal quality and the network performance.

More specifically, in this example, the radio access node 14 obtains a MU-MIMO compatibility matrix (step 206). In some embodiments, measurements or other information regarding the reception of the reference signals is provided to another network node, which generates the compatibility matrix and provides the compatibility matrix to the radio access node 14. However, other embodiments, the radio access node 14 generates and maintains the compatibility matrix based on the reception of the reference signals and a number of criteria. Note, however, that the radio access node 14 may also receive additional information regarding UEs 12 in neighboring cells such that the compatibility matrix may be generated to further include an indication of whether UEs 12 in neighboring cells are compatible with UEs 12 in the cell 16 served by the radio access node 14.

The compatibility matrix shows which UEs 12 are compatible (can be co-scheduled without deteriorating the network performance). There are a number of criteria that the radio access node 14 can use to create the compatibility matrix. One example is the spatial characteristics of the channel of each UE 12, such as the main Angle of Arrival (AoA) of the signal power during reception of the respective reference signal(s). Another criterion may be the MU-MIMO capability of the radio access node 14, which depends mainly on the number and placement of antenna elements. Yet another example can be the sensitivity of the receiver of the radio access node 14, which determines how weak signals can be and still be received by the radio access node 14 or how strong signals must be in order to be received by the radio access node 14. Furthermore, criteria based on the accepted intra-cell interference can also be employed. For instance, each time a UE 12 is co-scheduled with another UE 12, intra-cell interference increases which reduces the Signal to Interference plus Noise Ratio (SINR) of each UE 12. A threshold on the drop of the SINR per UE 12 could be used to limit the amount of allowed co-scheduled UEs 12.

The compatibility matrix can be a two-dimensional (2D) matrix with size equal to N×N, where N is the total number of connected UEs 12 to the radio access node 14 (N=3 in the exemplary scenario). In another example, the compatibility matrix can be a list of N entries, where each entry corresponds to a connected UE 12 and includes the identities of the other UEs 12 which are compatible with that UE 12. In both previous examples, binary based information on the compatibility is stored, meaning that two UEs 12 are either compatible or not. In an enhanced version, the compatibility matrix could include soft values or weights in a normalized scale of zero to one. A soft value of zero means completely non-compatible while one means completely orthogonal UEs 12 in the spatial domain. Soft values between zero and one indicate increasing levels of compatibility. Complete orthogonality between UEs 12 in the spatial domain implies that all interference power is cancelled from the useful signals. In contrast, zero level of orthogonality means that all signal power appears as interference power. A soft value between zero and one means a portion of the interfering signal adds interference to the useful signal.

In this embodiment, once the compatibility matrix has been obtained (e.g., generated), the radio access node 14 signals the compatibility information to the UEs 12 by sending the corresponding entries, which are referred to herein as compatibility vectors, to each of the UEs 12-1, 12-2, and 12-3 (steps 208-212). Hence, each UE 12 receives one entry from the compatibility matrix. The compatibility vector can carry information of the identities of the compatible UEs 12. Thus, as an example, the compatibility vector signaled to the UE 12-1 includes, in some embodiments, the identities of the other UEs 12 that are compatible with the UE 12-1, which in this example are the UEs 12-2 and 12-3. In another example, the compatibility vector can be a bitmap vector along with a list of all connected UEs 12. So, using the UE 12-1 as an example, the compatibility vector signaled to the UE 12-1 is, in some embodiments, a bitmap for all connected UEs 12 where each bit indicates whether the respective UE 12 is compatible with the UE 12-1. In yet another example, the compatibility vector can carry information of the compatibility soft values (compatibility weights).

In the illustrated example, at some point in time, data arrives at the UE 12-1 for transmission (step 214). Before transmission, the UE 12-1 performs an LBT procedure on the channel (step 216). In this example, the result of the LBT procedure is a determination that the channel is clear. As such, the UE 12-1 begins transmitting data on the channel (step 218). Upon determining that the UE 12-1 is transmitting on the channel, the radio access node 14 transmits a CCI message to at least one of the UEs 12 that are compatible with the UE 12-1 (step 220). In this example, by examining the compatibility matrix, the radio access node 14 determines that the UEs 12-2 and 12-3 are compatible with the UE 12-1 and, as such, the radio access node 14 transmits a CCI message to at least one of the UEs 12-2 and 12-3. In the illustrated example, the radio access node 14 transmits a CCI message to the UE 12-2 and, optionally, the UE 12-3, depending on the particular embodiment.

In this embodiment of FIGS. 9A and 9B, the CCI message is a general indication that the UE 12-2 and, optionally, the UE 12-3 are permitted to override the LBT procedure if the LBT procedure determined that the channel is busy due to the transmission by a compatible UE 12. For example, the CCI message may be a 1-bit dedicated control signaling flag, where a value of "1" means that the LBT override is permitted and a value of "0" means that LBT override is not permitted, or vice versa. As another example, the CCI message is in the form of an uplink scheduling grant. The radio access node 14 sends an uplink scheduling grant to the compatible UE(s) 12-2 and/or 12-3 meaning that they are allowed to transmit data when they have data to transmit. In yet another example, the CCI is in the form of increasing the LBT threshold of the compatible UE(s) 12-2 and/or 12-3. By means of increasing the threshold, the UEs 12-2 and 12-3 become less sensitive to the measured energy of the channel and thus can start transmitting data even though the channel is already occupied. The CCI can also be a combination of any two or more of the above alternatives. For example, the radio access node 14 can signal a binary CCI flag along with an uplink scheduling grant.

At some point while the UE 12-1 is transmitting data on the channel, data arrives at the UE 12-2 for transmission (step 222). Before transmitting the data, the UE 12-2 performs an LBT procedure (step 224). In this example, the result of the LBT procedure is a determination that the channel is busy.

In this embodiment, the UE 12-2 obtains the identities (i.e., the UE IDs) of the UE(s) 12 that are transmitting on the channel, which are referred to herein as active UEs (step 226). Notably, while showed as being performed after the LBT procedure, step 226 may be performed prior to, during, or after the LBT procedure. In this example, the UE 12-2 obtains the identity of the UE 12-1 as the UE that is active.

In this embodiment, the UE 12-2 (as well as the other UEs 12) are capable of determining the UE ID(s) of the UE(s) 12 that are transmitting data and occupy the channel. This can be done in several ways. For example, the UE 12-2 may determine the UE ID(s) of the UE(s) 12 that are transmitting and occupy the channel during the sensing period of the channel in a Carrier Sense Multiple Access and LBT (CSMA/LBT) protocol. One exemplary embodiment is that the UE 12-2, which is the UE 12 that wants to access the channel, is able to decode the preamble of the packets that are transmitted by the UE(s) 12 that are transmitting on the channel, which in this example is the UE 12-1. In another exemplary embodiment, the UE 12-1 that occupies the channel informs all other UEs 12 within a certain range by sending them a dedicated message including its own UE ID. In yet another example, a network node (e.g., the radio access node 14) signals by means of, e.g., broadcasting the UE ID(s) of the UE(s) 12 which are currently occupying the channel. Broadcasting the UE ID(s) by the network node can be triggered by the reception of data from a connected UE 12. The network node decodes the UE ID and then it sends this information to its connected UEs 12. In yet another example, the network node receives a specific request by any connected UE 12 to provide the UE ID(s) of the UE(s) 12 that currently occupy the channel. Hence, the network node can either broadcast this information as part of the system information to all connected UEs 12 (idle or active) or can unicast the UE ID information to UEs 12 that have requested this type of information. In another example, the network node can signal this information to the subset of connected UEs 12 that have the capability to determine the identity of UE(s) 12 that occupy the channel.

The UE 12-2 decides to override the LBT procedure based on the CCI message, the compatibility vector of the UE 12-2, and the obtained UE ID(s) (step 228). More specifically, since the UE 12-2 received the CCI message, the UE 12-2 is permitted to override the LBT procedure provided that the reason that the channel is busy is transmission(s) by a compatible UE(s). The UE 12-2 compares the UE ID(s) obtained in step 226 with the UE IDs contained in the compatibility vector of the UE 12-2. If the comparison is positive (i.e., if all of the UE IDs obtained in step 226 are included in the compatibility vector of the UE 12-2), then the UE 12-2 decides to override the LBT procedure; otherwise, the UE 12-2 decides not to override the LBT procedure. In yet another example, where the compatibility vector of the UE 12-2 includes soft values (i.e., compatibility weights), the UE 12-2 uses a function to construct the "degree of compatibility" as an aggregation of all the ongoing simultaneous transmissions and compare this aggregate outcome with a compatibility threshold value. Examples of such a function could be, sum of the weights, mean value, etc. The compatibility threshold value may be predefined or configured by the network.

In this particular example, since the UE 12-1 is transmitting, the UE 12-2 obtains the UE ID of the UE 12-1 in step 226. In this example, no other UEs 12 are transmitting (at least as can be detected by the UE 12-2). The UE 12-2 compares the UE ID obtained in step 226 to the UE IDs contained in the compatibility vector of the UE 12-2. Since the UE ID of the UE 12-1 is included in the compatibility vector, the UE 12-2 decides to override the LBT procedure. As such, even though the LBT procedure determined that the channel was busy, the UE 12-2 transmits uplink data on the channel (step 230).

Figure 10A:
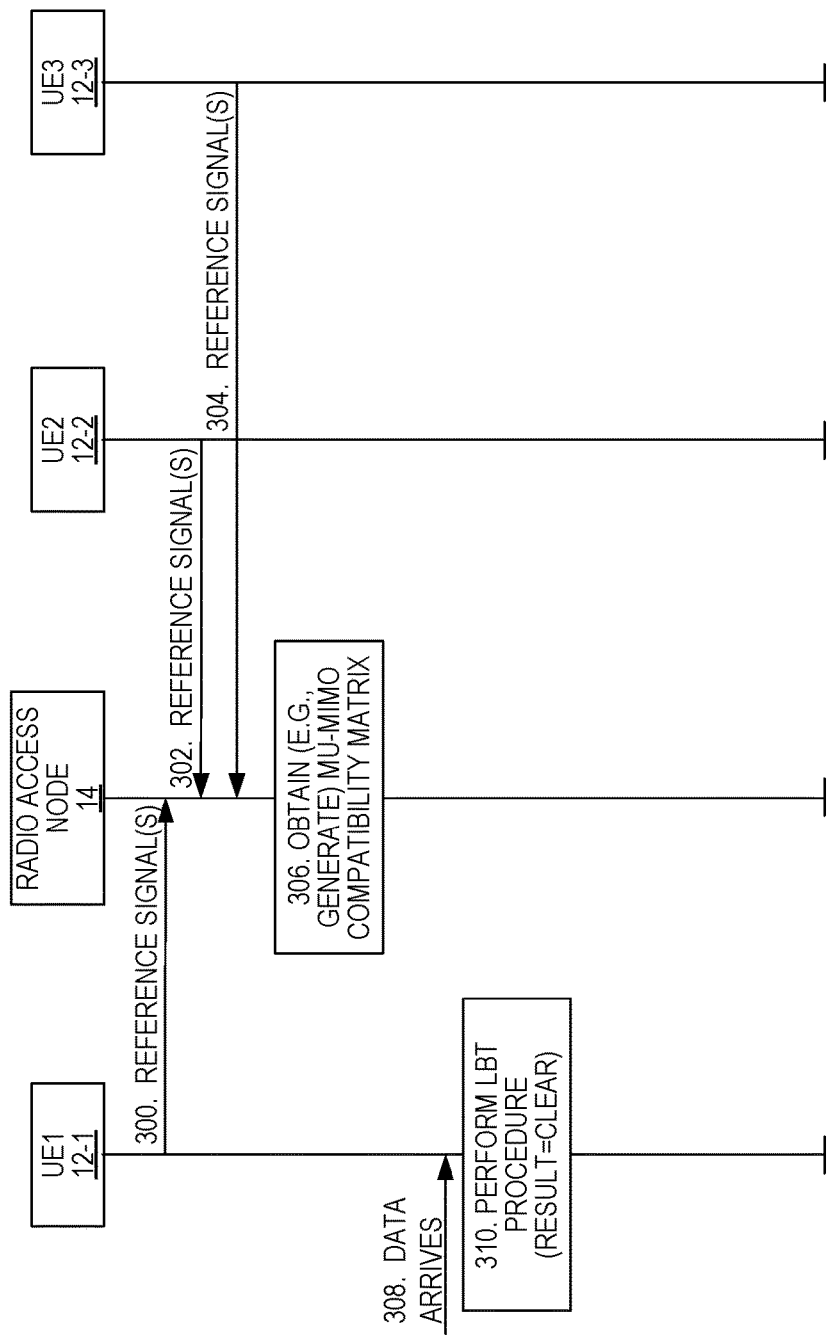
FIGS. 10A and 10B illustrate the operation of a number of UEs and a radio access node to provide LBT override according to some other embodiments of the present disclosure.
Figure 10B:
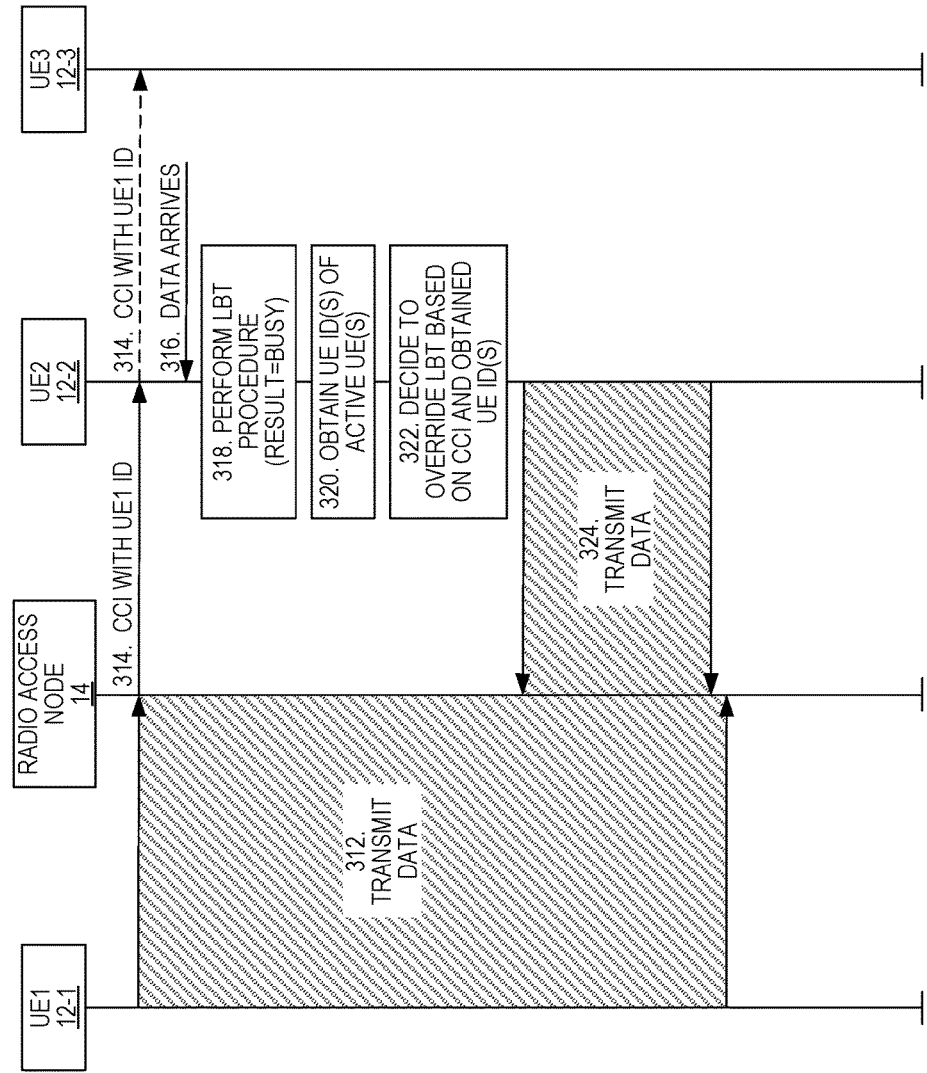

FIGS. 10A and 10B illustrate the operation of a number of UEs 12 (UE1, UE2, and UE3, which are referenced as UE 12-1, UE 12-2, and UE 12-3, respectively) and the radio access node 14 according to some embodiments of the present disclosure. In particular, FIGS. 10A and 10B illustrate another example variation or implementation of the process of FIG. 8. Importantly, in this example, both the UE 12-2 and the UE 12-3 are compatible with the UE 12-1 (i.e., UE 12-2 and UE 12-3 are or are in the set of compatible UEs for the UE 12-1), but UE 12-2 and UE 12-3 are non-compatible UEs (i.e., UE 12-3 is not in the set of compatible UEs for UE 12-2 and UE 12-2 is not in the set of compatible UEs for UE 12-3). The radio access node 14 has MU-MIMO capabilities (e.g., spatial de-multiplexing capabilities). The example of FIGS. 10A and 10B is similar to that of FIGS. 9A and 9B but where the compatibility vectors are not signaled to the UEs 12 but, rather, the UE IDs of the compatible UEs 12 are included in the respective CCI messages.

Steps 300-306 correspond to steps 200-206 described above. As such, the details are not repeated. In this example, once the compatibility matrix is obtained in step 306, the compatibility vectors are not transmitted to the UEs 12-1 through 12-3.

In the illustrated example, at some point in time, data arrives at the UE 12-1 for transmission (step 308). Before transmission, the UE 12-1 performs an LBT procedure on the channel (step 310). In this example, the result of the LBT procedure is a determination that the channel is clear. As such, the UE 12-1 begins transmitting data on the channel (step 312). Upon determining that the UE 12-1 is transmitting on the channel, the radio access node 14 transmits a CCI message to at least one of the UEs 12 that are compatible with the UE 12-1 (step 314). In this example, by examining the compatibility matrix, the radio access node 14 determines that the UEs 12-2 and 12-3 are compatible with the UE 12-1 and, as such, the radio access node 14 transmits a CCI message to at least one of the UEs 12-2 and 12-3. In the illustrated example, the radio access node 14 transmits a CCI message to the UE 12-2 and, optionally, the UE 12-3, depending on the particular embodiment.

In this embodiment of FIGS. 10A and 10B, the CCI message signaled to the UE 12-2 is an indication that the UE 12-2 is permitted to override the LBT procedure if the LBT procedure determined that the channel is busy due to the transmission a compatible UE 12. In addition, the CCI message signaled to the UE 12-2 includes an indication of the compatible UEs 12 for the UE 12-2. For example, the CCI message may include the UE IDs for the UEs 12 that are compatible with the UE 12-2. Likewise, if signaled, the CCI message provided to the UE 12-3 is an indication that the UE 12-3 is permitted to override the LBT procedure if the LBT procedure determined that the channel is busy due to the transmission a compatible UE 12. In addition, the CCI message signaled to the UE 12-3 includes an indication of the compatible UEs 12 for the UE 12-3. For example, the CCI message may include the UE IDs for the UEs 12 that are compatible with the UE 12-3.

At some point while the UE 12-1 is transmitting data on the channel, data arrives at the UE 12-2 for transmission (step 316). Before transmitting the data, the UE 12-2 performs an LBT procedure (step 318). In this example, the result of the LBT procedure is a determination that the channel is busy.

In this embodiment, the UE 12-2 obtains the identities (i.e., the UE IDs) of the UE(s) 12 that are transmitting on the channel, which are referred to herein as active UEs (step 320). Notably, while showed as being performed after the LBT procedure, step 320 may be performed prior to, during, or after the LBT procedure. In this example, the UE 12-2 obtains the identity of the UE 12-1 as the UE that is active. Various embodiments for how the UE 12-2 obtains the UE ID(s) of the UEs 12 that are transmitting and thus occupying the channel are described above and therefore not repeated here.

The UE 12-2 decides to override the LBT procedure based on the CCI message and the obtained UE ID(s) (step 322). More specifically, since the UE 12-2 received the CCI message, the UE 12-2 is permitted to override the LBT procedure provided that the reason that the channel is busy is transmission(s) by a compatible UE(s). The UE 12-2 compares the UE ID(s) obtained in step 320 with the UE IDs contained in the CCI message received by the UE 12-2 in step 314. If the comparison is positive (i.e., if all of the UE IDs obtained in step 320 are included in the CCI message received by the UE 12-2), then the UE 12-2 decides to override the LBT procedure; otherwise, the UE 12-2 decides not to override the LBT procedure. In yet another example, where the CCI message received by the UE 12-2 includes soft values (i.e., compatibility weights), the UE 12-2 uses a function to construct the "degree of compatibility" as an aggregation of all the ongoing simultaneous transmissions and compare this aggregate outcome with a compatibility threshold value. Examples of such a function could be, sum of the weights, mean value, etc. The compatibility threshold value may be predefined or configured by the network.

In this particular example, since the UE 12-1 is transmitting, the UE 12-2 obtains the UE ID of the UE 12-1 in step 320. In this example, no other UEs 12 are transmitting (at least as can be detected by the UE 12-2). The UE 12-2 compares the UE ID obtained in step 320 to the UE ID(s) contained in the CCI message received by the UE 12-2. Since the UE ID of the UE 12-1 is included in the CCI message, the UE 12-2 decides to override the LBT procedure. As such, even though the LBT procedure determined that the channel was busy, the UE 12-2 transmits uplink data on the channel (step 324).

Notably, while the embodiment of FIGS. 9A and 9B utilizes compatibility vectors and general CCI messages and the embodiment of FIGS. 10A and 10B utilizes CCI messages including the UE ID(s) of the compatible UE(s) 12 without the compatibility vectors, in some embodiments, the radio access node 14 may provide both the compatibility vectors and the CCI messages including the UE ID(s) of the compatible UE(s) 12 to the UEs 12. This may be beneficial where the radio access node 14 desires to provide the CCI message for less than all of the compatible UEs 12.

FIGS. 11 through 14 illustrate a number of variations to the embodiment of FIGS. 10A and 10B. Note, however, that these variations are equally applicable to the embodiment of FIGS. 9A and 9B.

Figure 11:
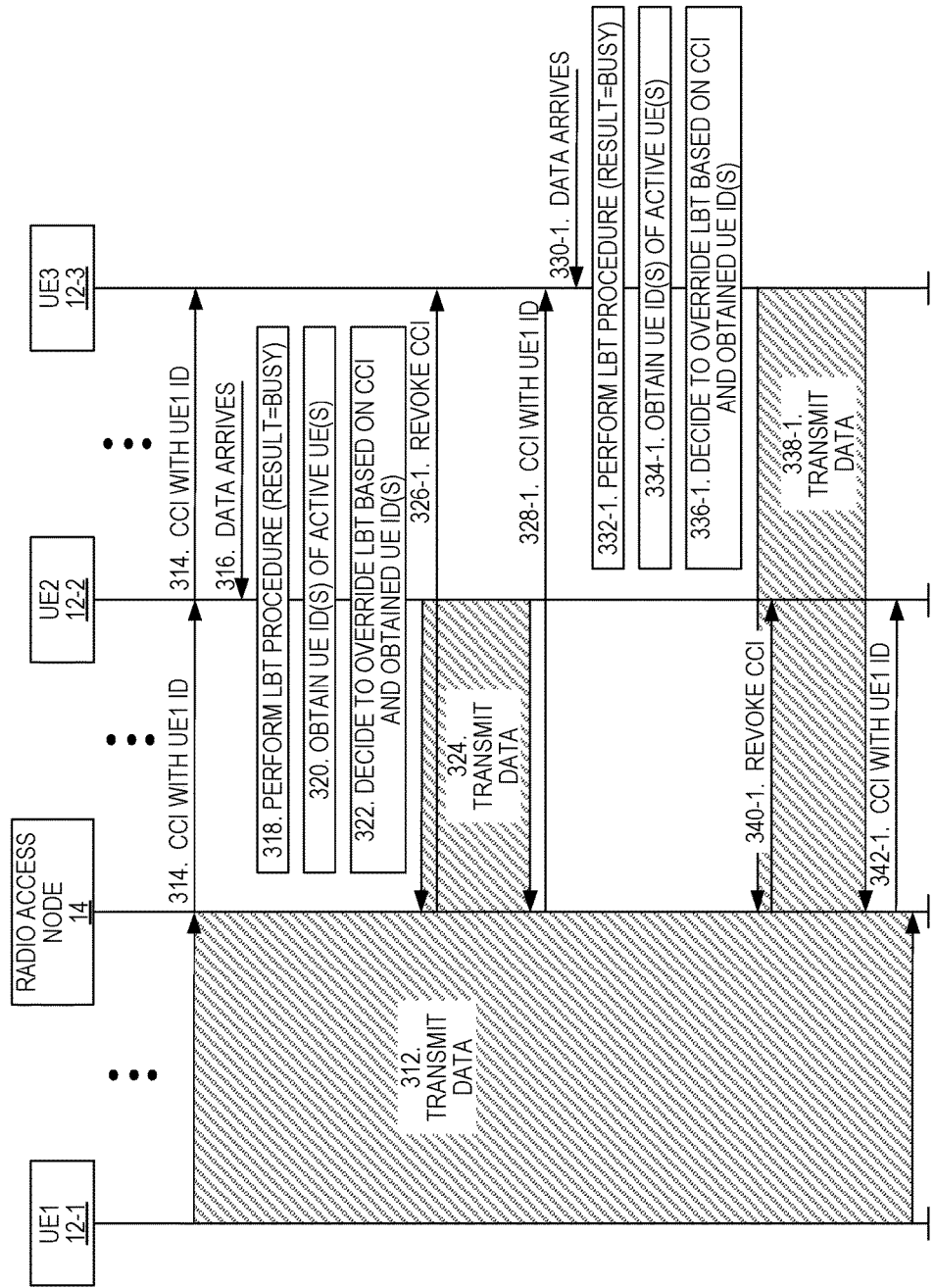
FIGS. 11 through 14 illustrate a number of variations to the process of FIGS. 10A and 10B according to some embodiments of the present disclosure.

FIG. 11 illustrates a first variation in which the radio access node 14 revokes the CCI message signaled to the UE 12-3 once the UE 12-2 begins transmitting since the UEs 12-2 and 12-3 are not compatible. More specifically, as illustrated, in step 314, the radio access node 14 signals CCI messages to both the UE 12-2 and the UE 12-3. However, once the UE 12-2 begins transmitting data on the channel in step 324, the radio access node 14 revokes the CCI message previously signaled to the UE 12-3 (step 326-1). For example, if the CCI message includes a dedicated control signaling flag, the flag may be set such that the UE 12-3 is not permitted to override LBT.

In this example, the UE 12-2 completes its data transmission before the UE 12-1 completes its data transmission. As such, once the UE 12-2 completes its data transmission (e.g., once the radio access node 14 determines that the UE 12-2 is no longer transmitting), the radio access node 14 signals a new CCI message to the UE 12-3 such that the UE 12-3 is again permitted to override LBT (step 328-1).

In this example, data arrives at the UE 12-3 for transmission (step 330-1). Before transmitting the data, the UE 12-3 performs an LBT procedure (step 332-1). In this example, the result of the LBT procedure is a determination that the channel is busy.

In this embodiment, the UE 12-3 obtains the identities (i.e., the UE IDs) of the UE(s) 12 that are transmitting on the channel, which are referred to herein as active UEs (step 334-1). Notably, while showed as being performed after the LBT procedure, step 334-1 may be performed prior to, during, or after the LBT procedure. In this example, the UE 12-3 obtains the identity of the UE 12-1 as the UE that is active. Various embodiments for how the UE 12-3 obtains the UE ID(s) of the UEs 12 that are transmitting and thus occupying the channel are described above and therefore not repeated here.

The UE 12-3 decides to override the LBT procedure based on the CCI message and the obtained UE ID(s) (step 336-1). More specifically, since the UE 12-3 received the CCI message in step 328-1, the UE 12-3 is permitted to override the LBT procedure provided that the reason that the channel is busy is transmission(s) by a compatible UE(s). The UE 12-3 compares the UE ID(s) obtained in step 334-1 with the UE IDs contained in the CCI message received by the UE 12-3 in step 328-1. If the comparison is positive (i.e., if all of the UE IDs obtained in step 334-1 are included in the CCI message received by the UE 12-3), then the UE 12-3 decides to override the LBT procedure; otherwise, the UE 12-3 decides not to override the LBT procedure. In yet another example, where the CCI message received by the UE 12-3 includes soft values (i.e., compatibility weights), the UE 12-3 uses a function to construct the "degree of compatibility" as an aggregation of all the ongoing simultaneous transmissions and compare this aggregate outcome with a compatibility threshold value. Examples of such a function could be sum of the weights, mean value, etc. The compatibility threshold value may be predefined or configured by the network.

In this particular example, since the UE 12-1 is transmitting, the UE 12-3 obtains the UE ID of the UE 12-1 in step 334-1. In this example, no other UEs 12 are transmitting (at least as can be detected by the UE 12-3). The UE 12-3 compares the UE ID obtained in step 334-1 to the UE ID(s) contained in the CCI message received by the UE 12-3. Since the UE ID of the UE 12-1 is included in the CCI message, the UE 12-3 decides to override the LBT procedure. As such, even though the LBT procedure determined that the channel was busy, the UE 12-3 transmits uplink data on the channel (step 338-1).

Once the UE 12-3 begins transmitting data on the channel in step 338-1, the radio access node 14 revokes the CCI message previously signaled to the UE 12-2 (step 340-1). For example, if the CCI message includes a dedicated control signaling flag, the flag may be set such that the UE 12-2 is not permitted to override LBT. In this example, the UE 12-3 completes its data transmission before the UE 12-1 completes its data transmission. As such, once the UE 12-3 completes its data transmission (e.g., once the radio access node 14 determines that the UE 12-3 is no longer transmitting), the radio access node 14 signals a new CCI message to the UE 12-2 such that the UE 12-2 is again permitted to override LBT (step 342-1). The process may then continue in this manner.

Figure 12:
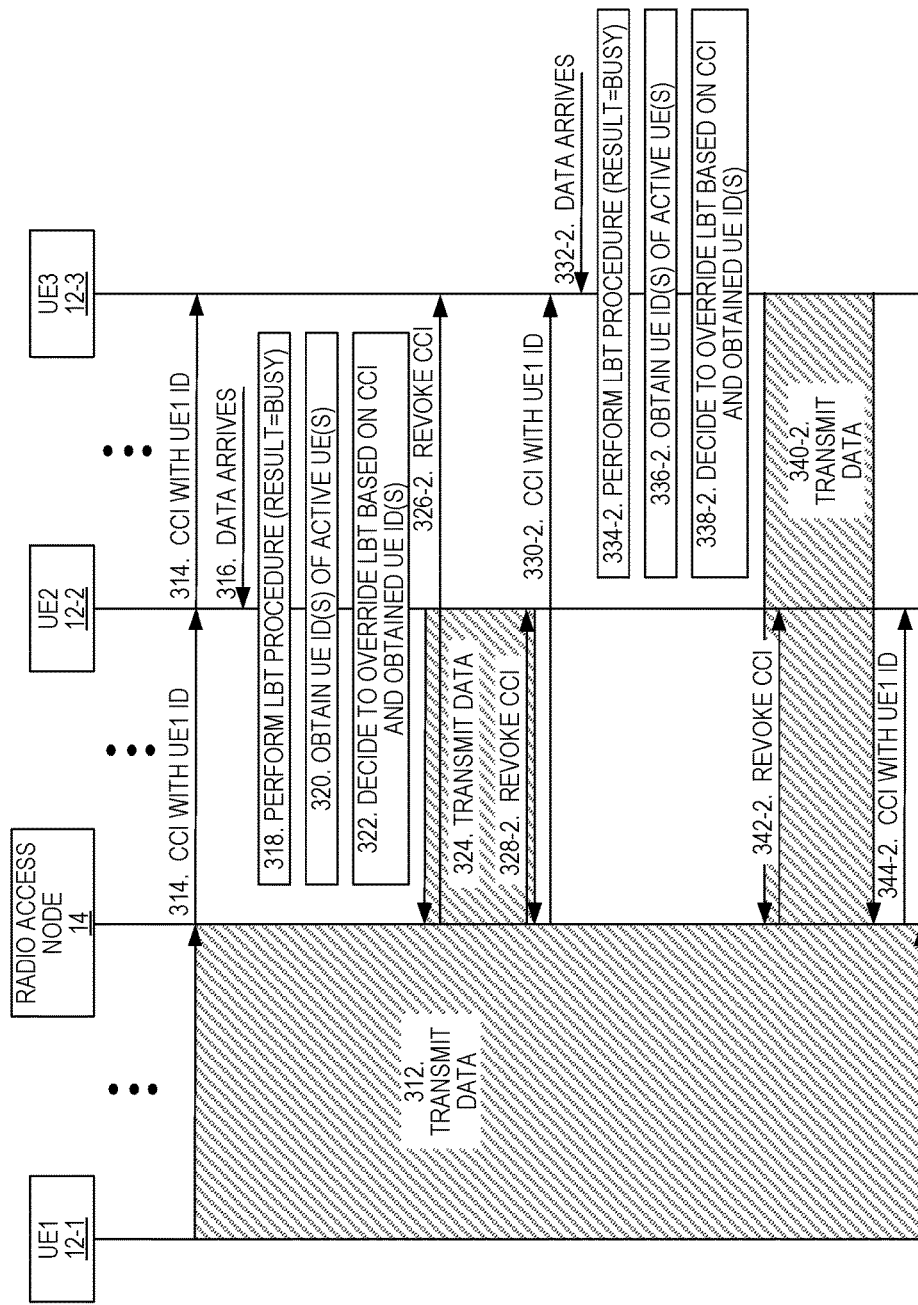

FIG. 12 illustrates a second variation in which the radio access node 14 revokes the CCI message signaled to the UE 12-2 in order to terminate the uplink transmission from the UE 12-2 early. More specifically, as illustrated, in step 314, the radio access node 14 signals CCI messages to both the UE 12-2 and the UE 12-3. Once the UE 12-2 begins transmitting data on the channel in step 324, the radio access node 14 revokes the CCI message previously signaled to the UE 12-3 (step 326-2). For example, if the CCI message includes a dedicated control signaling flag, the flag may be set such that the UE 12-3 is not permitted to override LBT.

In this example, the radio access node 14 decides to terminate the uplink data transmission from the UE 12-2. For example, the radio access node 14 may be informed that the UE 12-3 desires to transmit and the radio access node 14 decides to terminate the uplink data transmission from the UE 12-2 early in order to permit the UE 12-3 to transmit. This may occur if, for example, the UE 12-3 has a higher priority than the UE 12-2. Note that the manner in which the radio access node 14 is informed that the UE 12-3 desires to transmit may vary depending on the particular implementation. Any suitable mechanism may be used. For example, UE 12-3 may transmit a scheduling request message to the radio access node 14 on a dedicated frequency channel.

Once the radio access node 14 decides to terminate the uplink data transmission from the UE 12-2, the radio access node 14 revokes the CCI message previously signaled to the UE 12-2 (step 328-2). In response, the UE 12-2 terminates its uplink transmission. In addition, the radio access node 14 signals a new CCI message to the UE 12-3 such that the UE 12-3 is again permitted to override LBT (step 330-2).

In this example, data arrives at the UE 12-3 for transmission (step 332-2). Note that the arrival of data for uplink transmission at the UE 12-3 may or may not occur prior to steps 328-2 and 330-2. Before transmitting the data, the UE 12-3 performs an LBT procedure (step 334-2). In this example, the result of the LBT procedure is a determination that the channel is busy.

In this embodiment, the UE 12-3 obtains the identities (i.e., the UE IDs) of the UE(s) 12 that are transmitting on the channel, which are referred to herein as active UEs (step 336-2). Notably, while showed as being performed after the LBT procedure, step 336-2 may be performed prior to, during, or after the LBT procedure. In this example, the UE 12-3 obtains the identity of the UE 12-1 as the UE that is active. Various embodiments for how the UE 12-3 obtains the UE ID(s) of the UEs 12 that are transmitting and thus occupying the channel are described above and therefore not repeated here.

The UE 12-3 decides to override the LBT procedure based on the CCI message and the obtained UE ID(s) (step 338-2). More specifically, since the UE 12-3 received the CCI message in step 330-2, the UE 12-3 is permitted to override the LBT procedure provided that the reason that the channel is busy is transmission(s) by a compatible UE(s). The UE 12-3 compares the UE ID(s) obtained in step 336-2 with the UE IDs contained in the CCI message received by the UE 12-3 in step 330-2. If the comparison is positive (i.e., if all of the UE IDs obtained in step 336-2 are included in the CCI message received by the UE 12-3), then the UE 12-3 decides to override the LBT procedure; otherwise, the UE 12-3 decides not to override the LBT procedure. In yet another example, where the CCI message received by the UE 12-3 includes soft values (i.e., compatibility weights), the UE 12-3 uses a function to construct the "degree of compatibility" as an aggregation of all the ongoing simultaneous transmissions and compare this aggregate outcome with a compatibility threshold value. Examples of such a function could be sum of the weights, mean value, etc. The compatibility threshold value may be predefined or configured by the network.

In this particular example, since the UE 12-1 is transmitting, the UE 12-3 obtains the UE ID of the UE 12-1 in step 336-2. In this example, no other UEs 12 are transmitting (at least as can be detected by the UE 12-3). The UE 12-3 compares the UE ID obtained in step 336-2 to the UE ID(s) contained in the CCI message received by the UE 12-3. Since the UE ID of the UE 12-1 is included in the CCI message, the UE 12-3 decides to override the LBT procedure. As such, even though the LBT procedure determined that the channel was busy, the UE 12-3 transmits uplink data on the channel (step 340-2).

Once the UE 12-3 begins transmitting data on the channel in step 340-2, the radio access node 14 revokes the CCI message previously signaled to the UE 12-2 (step 342-2). For example, if the CCI message includes a dedicated control signaling flag, the flag may be set such that the UE 12-2 is not permitted to override LBT. In this example, the UE 12-3 completes its data transmission before the UE 12-1 completes its data transmission. As such, once the UE 12-3 completes its data transmission (e.g., once the radio access node 14 determines that the UE 12-3 is no longer transmitting), the radio access node 14 signals a new CCI message to the UE 12-2 such that the UE 12-2 is again permitted to override LBT (step 344-2). The process may then continue in this manner.

Figure 13:
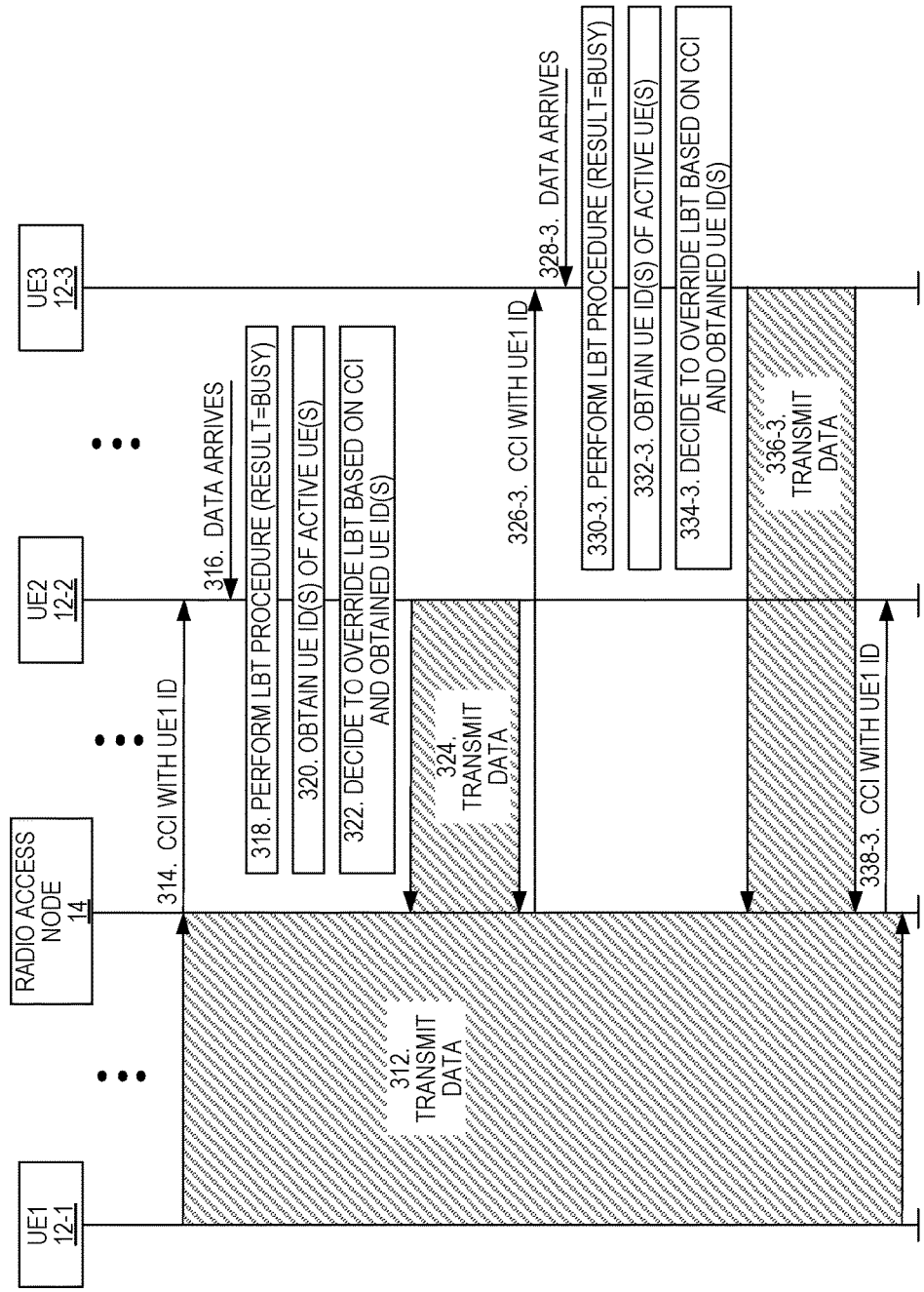

FIG. 13 illustrates a third variation in which the CCI messages are used to enable LBT override at only one of the UEs 12-2 and 12-3 at a time since the UEs 12-2 and 12-3 are not compatible with one another. More specifically, as illustrated, in step 314, the radio access node 14 signals a CCI message to only the UE 12-2. However, in this variation, the CCI message expires after some defined duration of time. For example, the CCI message may have an explicit or implicit duration. As one specific example, the CCI message may expire after a predefined amount of time or after an amount of time specified in the CCI message. As another example, the CCI message may expire once the uplink data transmission by the UE 12-2 is complete. Alternatively, the radio access node 14 may explicitly revoke the CCI message, e.g., once the UE 12-2 has completed its uplink data transmission, after a predefined amount of time, or when otherwise desired.

Once the CCI message signaled to the UE 12-2 has expired (or alternatively is revoked by the radio access node 14), the radio access node 14 signals a CCI message to the UE 12-3 (step 326-3). In this example, data arrives at the UE 12-3 for transmission (step 328-3). Before transmitting the data, the UE 12-3 performs an LBT procedure (step 330-3). In this example, the result of the LBT procedure is a determination that the channel is busy.

In this embodiment, the UE 12-3 obtains the identities (i.e., the UE IDs) of the UE(s) 12 that are transmitting on the channel, which are referred to herein as active UEs (step 332-3). Notably, while showed as being performed after the LBT procedure, step 332-3 may be performed prior to, during, or after the LBT procedure. In this example, the UE 12-3 obtains the identity of the UE 12-1 as the UE that is active. Various embodiments for how the UE 12-3 obtains the UE ID(s) of the UEs 12 that are transmitting and thus occupying the channel are described above and therefore not repeated here.

The UE 12-3 decides to override the LBT procedure based on the CCI message and the obtained UE ID(s) (step 334-3). More specifically, since the UE 12-3 received the CCI message in step 326-3, the UE 12-3 is permitted to override the LBT procedure provided that the reason that the channel is busy is transmission(s) by a compatible UE(s). The UE 12-3 compares the UE ID(s) obtained in step 332-3 with the UE IDs contained in the CCI message received by the UE 12-3 in step 326-3. If the comparison is positive (i.e., if all of the UE IDs obtained in step 332-3 are included in the CCI message received by the UE 12-3), then the UE 12-3 decides to override the LBT procedure; otherwise, the UE 12-3 decides not to override the LBT procedure. In yet another example, where the CCI message received by the UE 12-3 includes soft values (i.e., compatibility weights), the UE 12-3 uses a function to construct the "degree of compatibility" as an aggregation of all the ongoing simultaneous transmissions and compare this aggregate outcome with a compatibility threshold value. Examples of such a function could be sum of the weights, mean value, etc. The compatibility threshold value may be predefined or configured by the network.

In this particular example, since the UE 12-1 is transmitting, the UE 12-3 obtains the UE ID of the UE 12-1 in step 332-3. In this example, no other UEs 12 are transmitting (at least as can be detected by the UE 12-3). The UE 12-3 compares the UE ID obtained in step 332-3 to the UE ID(s) contained in the CCI message received by the UE 12-3. Since the UE ID of the UE 12-1 is included in the CCI message, the UE 12-3 decides to override the LBT procedure. As such, even though the LBT procedure determined that the channel was busy, the UE 12-3 transmits uplink data on the channel (step 336-3).

Once the CCI message of the UE 12-3 expires, the radio access node 14 signals a CCI message to the UE 12-2 (step 338-3). The process may then continue in this manner.

Figure 14:
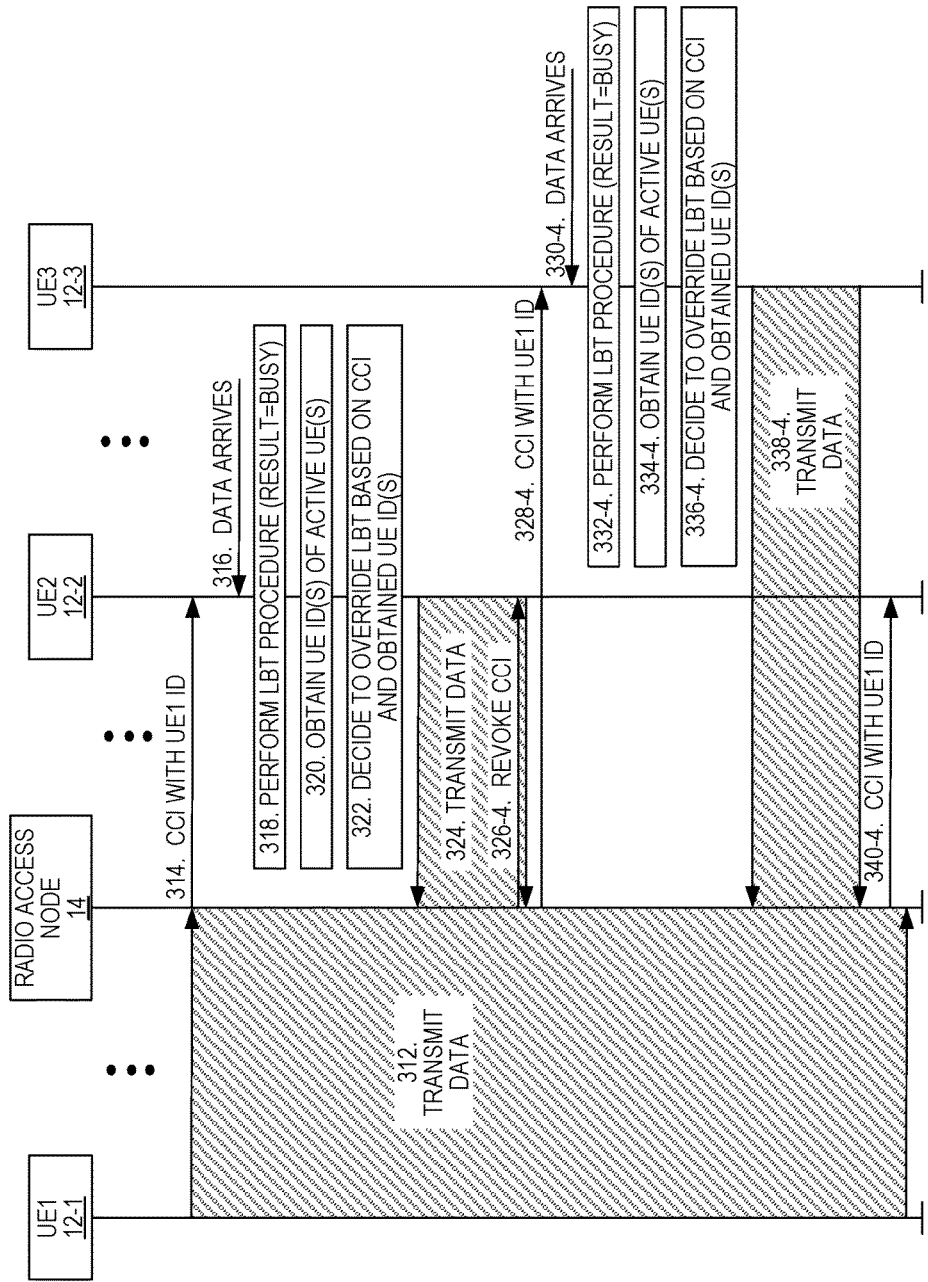

FIG. 14 illustrates a fourth variation that is similar to that of FIG. 13 but where the radio access node 14 revokes the CCI message of the UE 12-2 early. More specifically, as illustrated, in step 314, the radio access node 14 signals a CCI message to only the UE 12-2. Prior to expiration of the CCI message, the radio access node 14 decides to terminate the uplink data transmission from the UE 12-2. For example, the radio access node 14 may be informed that the UE 12-3 desires to transmit and decide to terminate the uplink data transmission from the UE 12-2 early in order to permit the UE 12-3 to transmit. This may occur if, for example, the UE 12-3 has a higher priority than the UE 12-2. Note that the manner in which the radio access node 14 is informed that the UE 12-3 desires to transmit may vary depending on the particular implementation. Any suitable mechanism may be used. For example, UE 12-3 may transmit a scheduling request message to the radio access node 14 on a dedicated frequency channel.

Once the radio access node 14 decides to terminate the uplink data transmission from the UE 12-2, the radio access node 14 revokes the CCI message previously signaled to the UE 12-2 (step 326-4). In response, the UE 12-2 terminates its uplink transmission. In addition, the radio access node 14 signals a CCI message to the UE 12-3 such that the UE 12-3 is permitted to override LBT (step 328-4). From this point, the process proceeds as described above with respect to FIG. 13. In particular, in this example, data arrives at the UE 12-3 for transmission (step 330-4). Before transmitting the data, the UE 12-3 performs an LBT procedure (step 332-4). In this example, the result of the LBT procedure is a determination that the channel is busy.

In this embodiment, the UE 12-3 obtains the identities (i.e., the UE IDs) of the UE(s) 12 that are transmitting on the channel, which are referred to herein as active UEs (step 334-4). The UE 12-3 decides to override the LBT procedure based on the CCI message and the obtained UE ID(s) (step 336-4). In this particular example, since the UE 12-1 is transmitting, the UE 12-3 obtains the UE ID of the UE 12-1 in step 334-4. In this example, no other UEs 12 are transmitting (at least as can be detected by the UE 12-3). The UE 12-3 compares the UE ID obtained in step 334-4 to the UE ID(s) contained in the CCI message received by the UE 12-3. Since the UE ID of the UE 12-1 is included in the CCI message, the UE 12-3 decides to override the LBT procedure. As such, even though the LBT procedure determined that the channel was busy, the UE 12-3 transmits uplink data on the channel (step 338-4). Once the CCI message of the UE 12-3 expires, the radio access node 14 signals a CCI message to the UE 12-2 (step 340-4). The process may then continue in this manner.

Figure 15A:
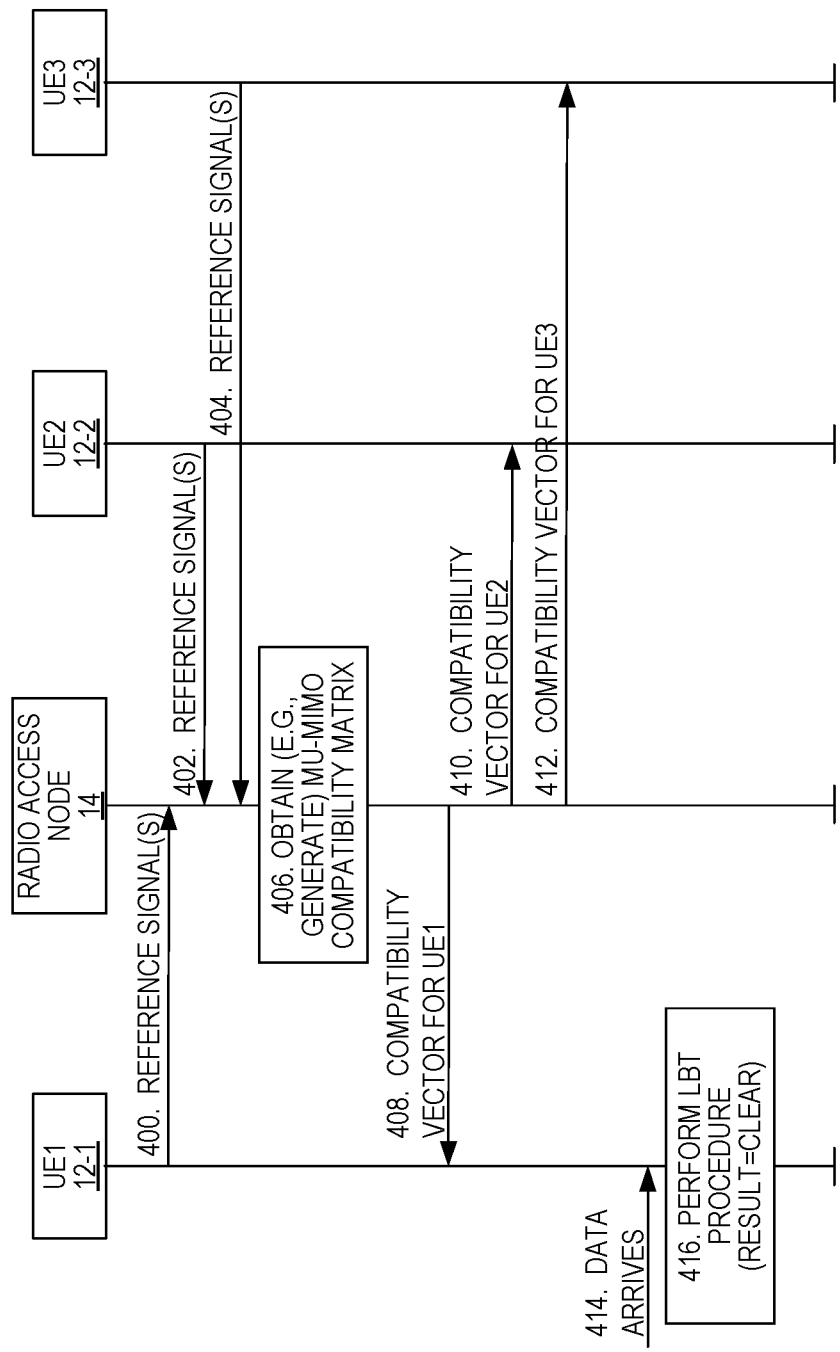
FIGS. 15A and 15B illustrate the operation of a number of UEs and a radio access node to provide LBT override according to some other embodiments of the present disclosure.
Figure 15B:
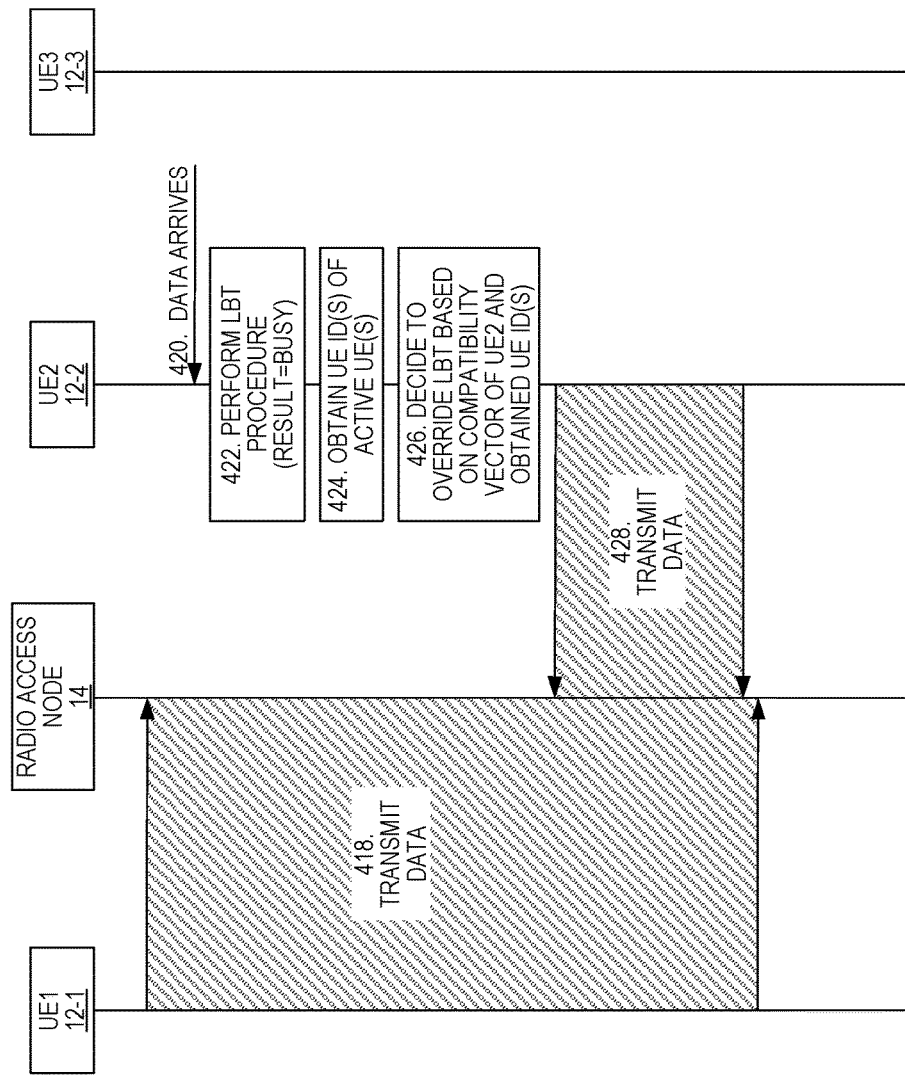

FIGS. 15A and 15B illustrate the operation of a number of UEs 12 (UE1, UE2, and UE3, which are referenced as UE 12-1, UE 12-2, and UE 12-3, respectively) and the radio access node 14 according to some embodiments of the present disclosure. In particular, FIGS. 15A and 15B illustrate one example variation or implementation of the process of FIG. 8 that is similar to that of FIGS. 9A and 9B but where CCI messages are not used. Importantly, in this example, both the UE 12-2 and UE 12-3 are compatible with UE 12-1 (i.e., UE 12-2 and UE 12-3 are or are in the set of compatible UEs for the UE 12-1), but the UE 12-2 and UE 12-3 are non-compatible UEs (i.e., UE 12-3 is not in the set of compatible UEs for UE 12-2 and UE 12-2 is not in the set of compatible UEs for UE 12-3). The radio access node 14 has MU-MIMO capabilities (e.g., spatial de-multiplexing capabilities).

Steps 400-412 are the same as steps 200-212 of FIGS. 9A and 9B. As such, the details are not repeated. In the illustrated example, at some point in time, data arrives at the UE 12-1 for transmission (step 414). Before transmission, the UE 12-1 performs an LBT procedure on the channel (step 416). In this example, the result of the LBT procedure is a determination that the channel is clear. As such, the UE 12-1 begins transmitting data on the channel (step 418). Notably, unlike in the process of FIGS. 9A and 9B, CCI messages are not provided to the UEs 12-2 and 12-3. Rather, the UEs 12-2 and 12-3 use their compatibility vectors along with obtained UE ID(s) of the UE(s) 12 that is(are) transmitting on the channel and thus occupying the channel to autonomously decide whether to override LBT.

At some point while the UE 12-1 is transmitting data on the channel, data arrives at the UE 12-2 for transmission (step 420). Before transmitting the data, the UE 12-2 performs an LBT procedure (step 422). In this example, the result of the LBT procedure is a determination that the channel is busy.

In this embodiment, the UE 12-2 obtains the identities (i.e., the UE IDs) of the UE(s) 12 that are transmitting on the channel, which are referred to herein as active UEs (step 424). Notably, while showed as being performed after the LBT procedure, step 424 may be performed prior to, during, or after the LBT procedure. In this example, the UE 12-2 obtains the identity of the UE 12-1 as the UE that is active. Note that many ways in which the UE 12-2 may obtain the UE ID(s) of the active UE(s) 12 are described above and the details are not repeated here.

The UE 12-2 decides to override the LBT procedure based on the compatibility vector of the UE 12-2 and the obtained UE ID(s) (step 426). More specifically, the UE 12-2 compares the UE ID(s) obtained in step 424 with the UE IDs contained in the compatibility vector of the UE 12-2. If the comparison is positive (i.e., if all of the UE IDs obtained in step 424 are included in the compatibility vector of the UE 12-2), then the UE 12-2 decides to override the LBT procedure; otherwise, the UE 12-2 decides not to override the LBT procedure. Notably, if the UE 12-3 were already transmitting, the UE 12-2 would decide not to override the LBT procedure since the UE ID of the UE 12-3 is not in the compatibility vector of the UE 12-2. In yet another example, where the compatibility vector of the UE 12-2 includes soft values (i.e., compatibility weights), the UE 12-2 uses a function to construct the "degree of compatibility" as an aggregation of all the ongoing simultaneous transmissions and compare this aggregate outcome with a compatibility threshold value. Examples of such a function could be sum of the weights, mean value, etc. The compatibility threshold value may be predefined or configured by the network.

In this particular example, since the UE 12-1 is transmitting, the UE 12-2 obtains the UE ID of the UE 12-1 in step 424. In this example, no other UEs 12 are transmitting (at least as can be detected by the UE 12-2). The UE 12-2 compares the UE ID obtained in step 424 to the UE IDs contained in the compatibility vector of the UE 12-2. Since the UE ID of the UE 12-1 is included in the compatibility vector, the UE 12-2 decides to override the LBT procedure. As such, even though the LBT procedure determined that the channel was busy, the UE 12-2 transmits uplink data on the channel (step 428).

Figure 16A:
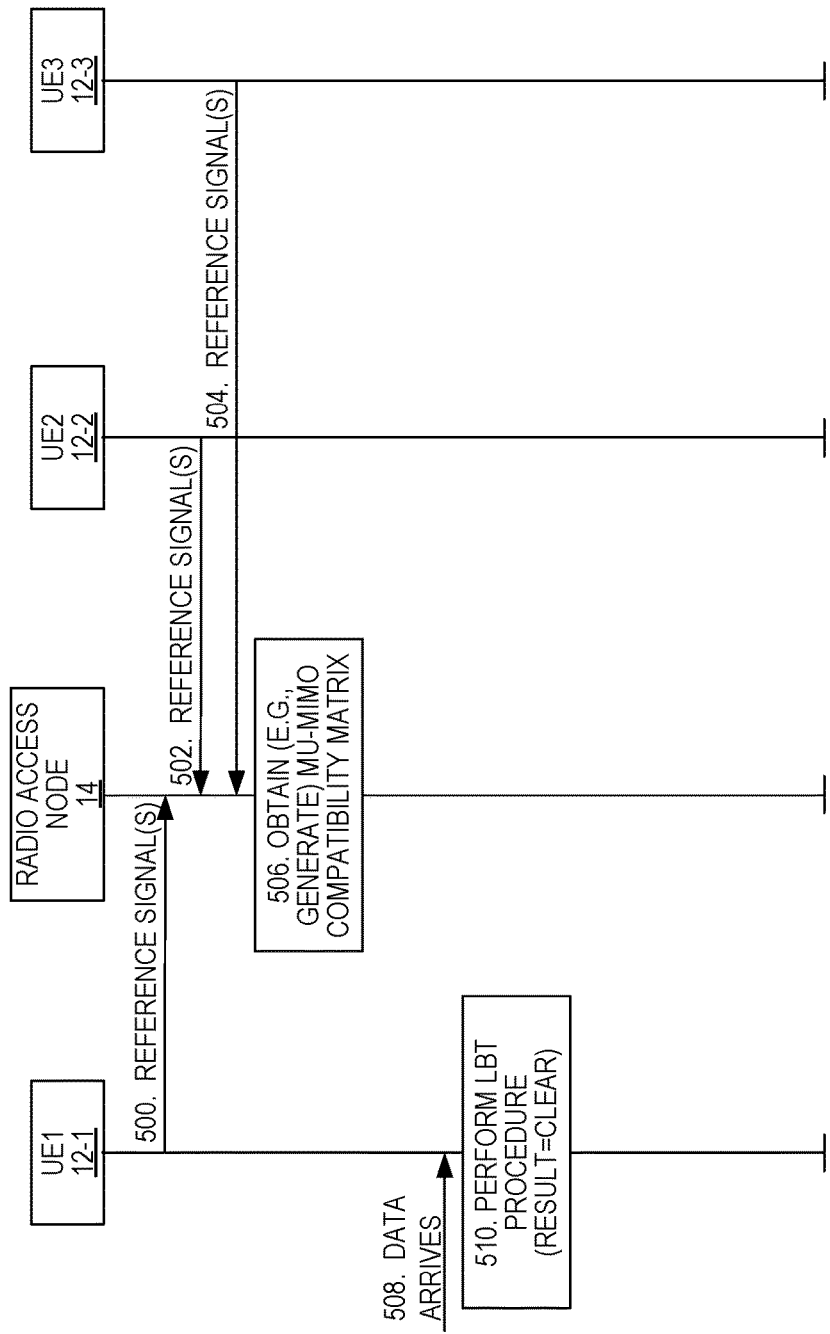
FIGS. 16A and 16B illustrate the operation of a number of UEs and a radio access node to provide LBT override according to some other embodiments of the present disclosure.
Figure 16B:
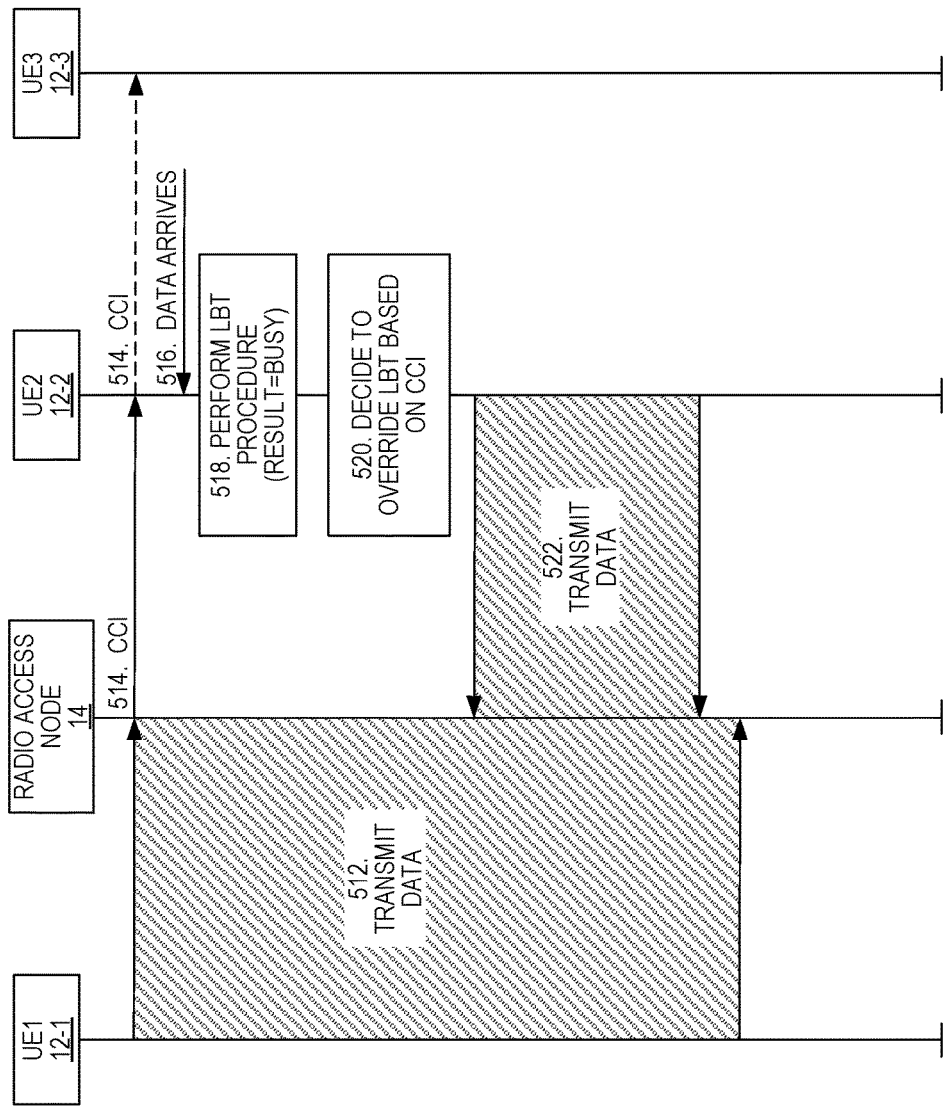

In the embodiments described thus far with respect to FIGS. 9A and 9B through FIGS. 15A and 15B, the UEs 12 are enabled to obtain the UE ID(s) of the UE(s) 12 that are transmitting and thus occupying the channel. However, in some scenarios, the UEs 12 may either not be able to obtain the UE ID(s) of the UE(s) 12 that are transmitting or it may be undesirable for the UEs 12 to do so. In this regard, FIGS. 16A and 16B illustrate the operation of a number of UEs 12 (UE1, UE2, and UE3, which are referenced as UE 12-1, UE 12-2, and UE 12-3, respectively) and the radio access node 14 according to some embodiments of the present disclosure in which the UEs 12 are not required to obtain the UE ID(s) of the UE(s) 12 occupying the channel. Importantly, in this example, both the UE 12-2 and the UE 12-3 are compatible with UE the 12-1 (i.e., UE 12-2 and UE 12-3 are or are in the set of compatible UEs for the UE 12-1), but UE 12-2 and UE 12-3 are non-compatible UEs (i.e., UE 12-3 is not in the set of compatible UEs for UE 12-2 and UE 12-2 is not in the set of compatible UEs for UE 12-3). The radio access node 14 has MU-MIMO capabilities (e.g., spatial de-multiplexing capabilities).

Steps 500-506 correspond to steps 200-206 described above. As such, the details are not repeated. In this example, once the compatibility matrix is obtained in step 506, the compatibility vectors are not transmitted to the UEs 12-1 through 12-3.

In the illustrated example, at some point in time, data arrives at the UE 12-1 for transmission (step 508). Before transmission, the UE 12-1 performs an LBT procedure on the channel (step 510). In this example, the result of the LBT procedure is a determination that the channel is clear. As such, the UE 12-1 begins transmitting data on the channel (step 512). Upon determining that the UE 12-1 is transmitting on the channel, the radio access node 14 transmits a CCI message to at least one of the UEs 12 that are compatible with the UE 12-1 (step 514). In this example, by examining the compatibility matrix, the radio access node 14 determines that the UEs 12-2 and 12-3 are compatible with the UE 12-1 and, as such, the radio access node 14 transmits a CCI message to at least one of the UEs 12-2 and 12-3 (step 514). In the illustrated example, the radio access node 14 transmits a CCI message to the UE 12-2 and, optionally, the UE 12-3, depending on the particular embodiment.

In this embodiment of FIGS. 16A and 16B, the CCI message signaled to the UE 12-2 is an indication that the UE 12-2 is permitted to override the LBT procedure. Likewise, if signaled, the CCI message provided to the UE 12-3 is an indication that the UE 12-2 is permitted to override the LBT procedure. Further, in some embodiments, the radio access node 14 sends the CCI message to the UE 12-2 and/or the UE 12-3 periodically as long as the UE 12-1 is transmitting. In some embodiments, one or more conditions, or criteria, must be satisfied before the radio access node 12 transmits the CCI message to the UE 12-2 and/or the UE 12-3. These conditions may include, for example, one or more conditions related to the channel between the UE 12-2, 12-3 and the radio access node 14, a condition that requires orthogonality in the spatial domain with the UE 12-1 that is already transmitting, and/or a condition that a request for a CCI message or uplink transmission was received by the radio access node 14 from the UE 12-2, 12-3. In some embodiments, the CCI messages may include or be sent together with scheduling information. This scheduling information can provide constraints on which time-frequency domain resources the UE 12 can utilize in case there are data to be transmitted. By applying constraints, the radio access node 14 can guarantee the orthogonality of non-compatible UEs 12 which are still compatible to the UE 12-1 already occupying the channel. In the exemplary scenario, the UE 12-2 and the UE 12-3 will be scheduled (or use) different time-frequency resources to avoid being mutually co-scheduled. Still further, in some embodiments, the CCI message may include an explicit or implicit duration (i.e., the CCI message may expire after an explicitly defined or implicitly defined amount of time). The duration of the CCI message may be predefined or configured (e.g., included in the CCI message).

At some point while the UE 12-1 is transmitting data on the channel, data arrives at the UE 12-2 for transmission (step 516). Before transmitting the data, the UE 12-2 performs an LBT procedure (step 518). In this example, the result of the LBT procedure is a determination that the channel is busy. Alternatively, since the UE 12-2 received the CCI message, the UE 12-2 may skip the LBT procedure altogether. The UE 12-2 decides to override the LBT procedure based on the CCI message (step 520). In this example, the UE 12-2 decides to override the LBT procedure and, as such, the UE 12-2 transmits uplink data on the channel (step 522). Notably, as discussed above, in some embodiments, the CCI message may expire after a defined amount of time. Once the CCI message expires, the UE 12-2 is no longer permitted to override LBT. Further, in some embodiments, the radio access node 14 may revoke, or release, the CCI message previously provided to the UE 12-2. This revocation may be used to, e.g., revoke a CCI message in embodiments where the CCI message does not expire or revoke a CCI message early in embodiments where the CCI message will expire. Note that the variations of FIGS. 11 through 14 described above are equally applicable to the process of FIGS. 16A and 16B.

Thus far, the embodiments described generally relate to a single cell. However, the concepts described herein are easily extendible to multiple cells. In a multi-cell scenario, the embodiments described above are complemented by some further steps, since UEs 12 in the proximity of each other but served by neighboring radio access nodes 14 may cause interference to the respective non-serving radio access nodes 14 and therefore they should be taken into account when determining the compatibility set and the number of ongoing simultaneous transmissions. In some embodiments, measurements related to handover management are used to identify UEs 12 that can potentially cause MU-MIMO interference at a neighbor radio access node 14 since those UEs 12 are typically the ones that are or may become eligible for handover. Thus, in some embodiments, the notion of handover zones and measurements related to handover management are used. As used herein, a handover zone is a geographical area in which a UE 12 is able to communicate with any one of at least two radio access nodes 14. A handover zone can be determined by radio reference signal measurements. For example, a UE 12 is in a handover zone when the difference between the received power levels of reference signals transmitted by at least two radio access nodes 14 is less than a predefined threshold value.

Figure 17:
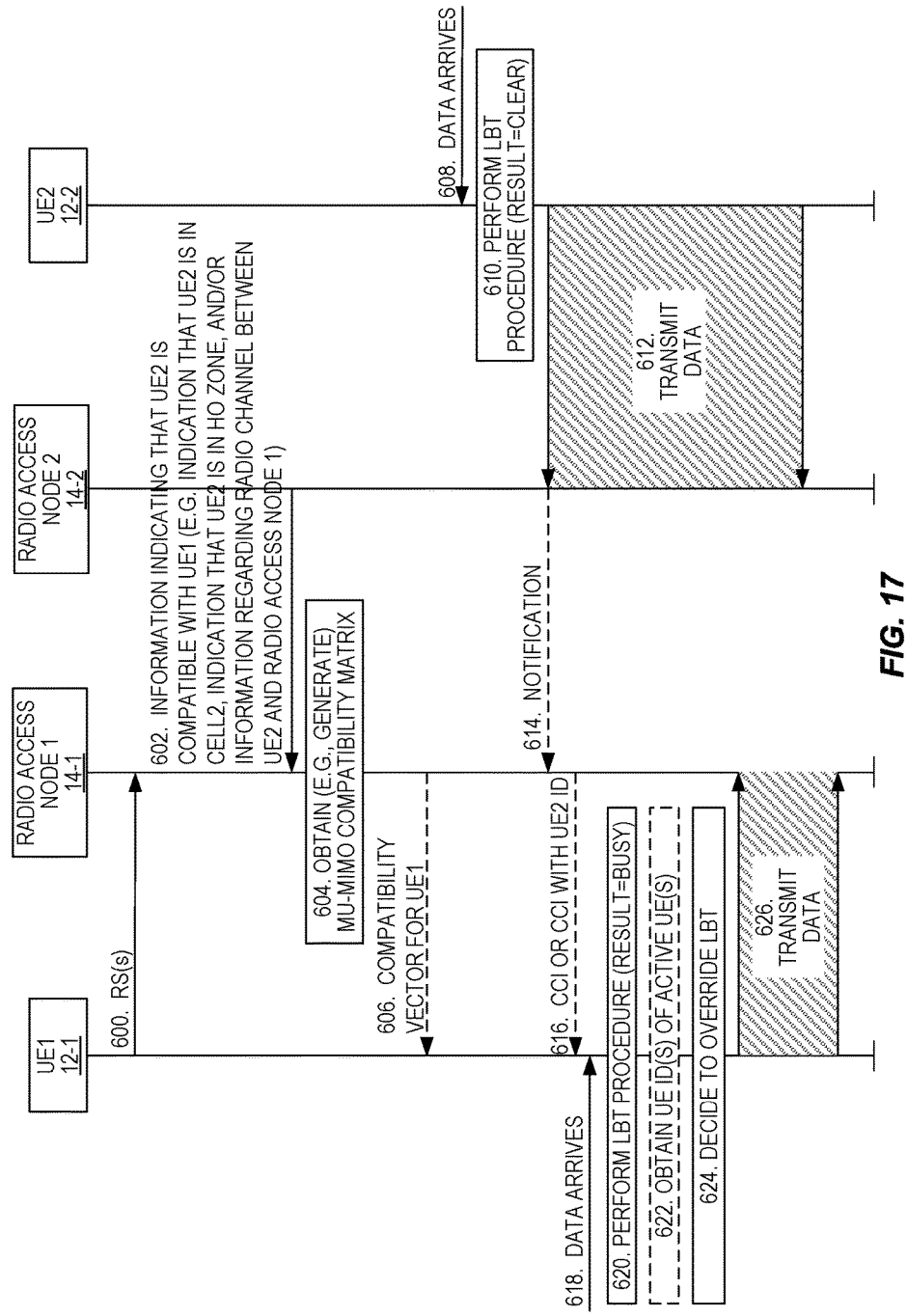
FIG. 17 illustrates the operation of the cellular communications network including some multi-cell aspects according to some embodiments of the present disclosure.

FIG. 17 illustrates the operation of the cellular communications network 10 including some multi-cell aspects according to some embodiments of the present disclosure. In this example, a first UE 12-1 is served by a first radio access node 14-1, and a second UE 12-2 is served by a second radio access node 14-2. While not illustrated, additional UEs 12 may be served by the first radio access node 14-1 and the second radio access node 14-2. At least the first radio access node 14-1 has MU-MIMO capabilities (e.g., spatial de-multiplexing capabilities).

The UE 12-1 transmits a reference signal(s) to the first radio access node 14-1, e.g., as part of a channel estimation process, as described above (step 600). While not illustrated, other UEs 12 also transmit reference signals to the first radio access node 14-1. In addition, the second radio access node 14-2 sends information to the first radio access node 14-1 indicating that the UE 12-2 is compatible with the UE 12-1 (step 602). In some embodiments, this information includes an indication that the UE 12-2 is in the cell served by the second radio access node 14-2, where the radio access nodes 14-1 and 14-2 are neighboring radio access nodes and the first radio access node 14-1 can assume that any UE 12 in the cell served by the second radio access node 14-2 is compatible with the UE 12-1 because, e.g., UEs 12 in the neighboring cells use orthogonal resources. These orthogonal resources may refer to spatially orthogonal or near optimal resources, as discussed in the examples of soft values in the description of the compatibility matrix. Spatial near optimality means that the receiver at the radio access node 14 is able to separate the individual signals of multiple UEs 12 out of a received composite signal. In some embodiments, the information includes an indication that the UE 12-2 is in a handover zone between the cells served by the radio access nodes 14-1 and 14-2, where the first radio access node 14-1 can assume that any UE 12 in the handover zone between the cells served by the radio access nodes 14-1 and 14-2 is compatible with the UE 12-1 because, e.g., UEs 12 in the neighboring cells use orthogonal resources. Further, because the UE 12-2 is in the handover zone, the UE 12-2 is more likely to be the cause of a "busy" channel detected by the LBT procedure of the UE 12-1. In some embodiments, the information includes information regarding a radio channel between the UE 12-2 and the first radio access node 12-1 (e.g., one or more measurements such as, e.g., Reference Signal Received Power (RSRP) or Reference Signal Received Quality (RSRQ) measurements). The information may include any one or any combination of the examples described above.

Based on the reception of the reference signal(s) from the UE 12-1, the reception of reference signals from additional UEs 12 (not shown in FIG. 17) in the cell served by the first radio access node 14-1, and the information received from the second radio access node 14-2, the first radio access node 14-1 obtains a MU-MIMO compatibility matrix (step 604). In some embodiments, measurements or other information regarding the reception of the reference signals as well as the information received from the second radio access node 14-2 regarding the UE 12-2 is provided to another network node, which generates the compatibility matrix and provides the compatibility matrix to the first radio access node 14-1. However, other embodiments, the first radio access node 14-1 generates and maintains the compatibility matrix based on the reception of the reference signals, the information received from the second radio access node 14-2, and a number of criteria. In this manner, the compatibility matrix is generated to further include an indication of whether UEs 12 in neighboring cells (e.g., the UE 12-2) are compatible with UEs 12 in the cell served by the first radio access node 14-1.

From this point on, the process may proceed according to any of the embodiments described above with respect to FIGS. 9A and 9B through FIGS. 15A and 15B. Specifically, in some embodiments, the first radio access node 14-1 signals the compatibility vector of the UE 12-1 to the UE 12-1 (step 606). As discussed above, the compatibility vector of the UE 12-1 is the entry of the compatibility matrix that defines the UEs 12 that are compatible with the UE 12-1. In this example, the compatible UEs 12 include the UE 12-2 in the neighboring cell.

In the illustrated example, at some point in time, data arrives at the UE 12-2 for transmission (step 608). Before transmission, the UE 12-2 performs an LBT procedure on the channel (step 610). In this example, the result of the LBT procedure is a determination that the channel is clear. As such, the UE 12-2 begins transmitting data on the channel (step 612). Optionally, upon determining that the UE 12-2 is transmitting on the channel, the second radio access node 14-2 sends a respective notification to the first radio access node 14-1 (step 614).

In some embodiments, upon determining that the UE 12-2 is transmitting on the channel either based on the notification received from the second radio access node 14-2 or otherwise, the first radio access node 14-1 transmits a CCI message to at least one of the UEs 12 served by the first radio access node 14-1 that is compatible with the UE 12-2. In this example, by examining the compatibility matrix, the first radio access node 14-1 determines that the UE 12-1 is compatible with the UE 12-2 and, as such, the first radio access node 14-1 transmits a CCI message to the UE 12-1 (step 616). As discussed above, in some embodiments, the CCI message is an indication that the UE 12-1 is permitted to override the LBT procedure. Further, in some embodiments, the CCI message includes the UE IDs compatible UEs 12 for the UE 12-1, which in this example include the UE 12-2.

At some point while the UE 12-2 is transmitting data on the channel, data arrives at the UE 12-1 for transmission (step 618). Before transmitting the data, the UE 12-1 performs an LBT procedure (step 620). In this example, the result of the LBT procedure is a determination that the channel is busy.

As discussed above, in some embodiments, the UE 12-1 obtains the identities (i.e., the UE IDs) of the UE(s) 12 that are transmitting on the channel, which are referred to herein as active UEs (step 622). Notably, while showed as being performed after the LBT procedure, step 622 may be performed prior to, during, or after the LBT procedure. In this example, the UE 12-1 obtains the identity of the UE 12-1 as the UE that is active.

The UE 12-1 decides to override the LBT procedure (step 624). As discussed above, in some embodiments, the UE 12-1 decides to override the LBT procedure based on the CCI message, the compatibility vector of the UE 12-2, and the obtained UE ID(s). In other embodiments, the UE 12-1 decides to override the LBT procedure based on the CCI message which in this case includes the UE ID(s) of the compatible UE(s) for the UE 12-1 and the UE ID(s) obtained in step 622. Still further, in other embodiments, the UE 12-1 decides to override the LBT procedure based on the CCI message. Upon deciding to override the LBT procedure, the UE 12-1 transmits data on the channel (step 626). Note that, in the embodiments in which CCI messages are used, the variations of FIGS. 11 through 14 may be applied.

Figure 18A:
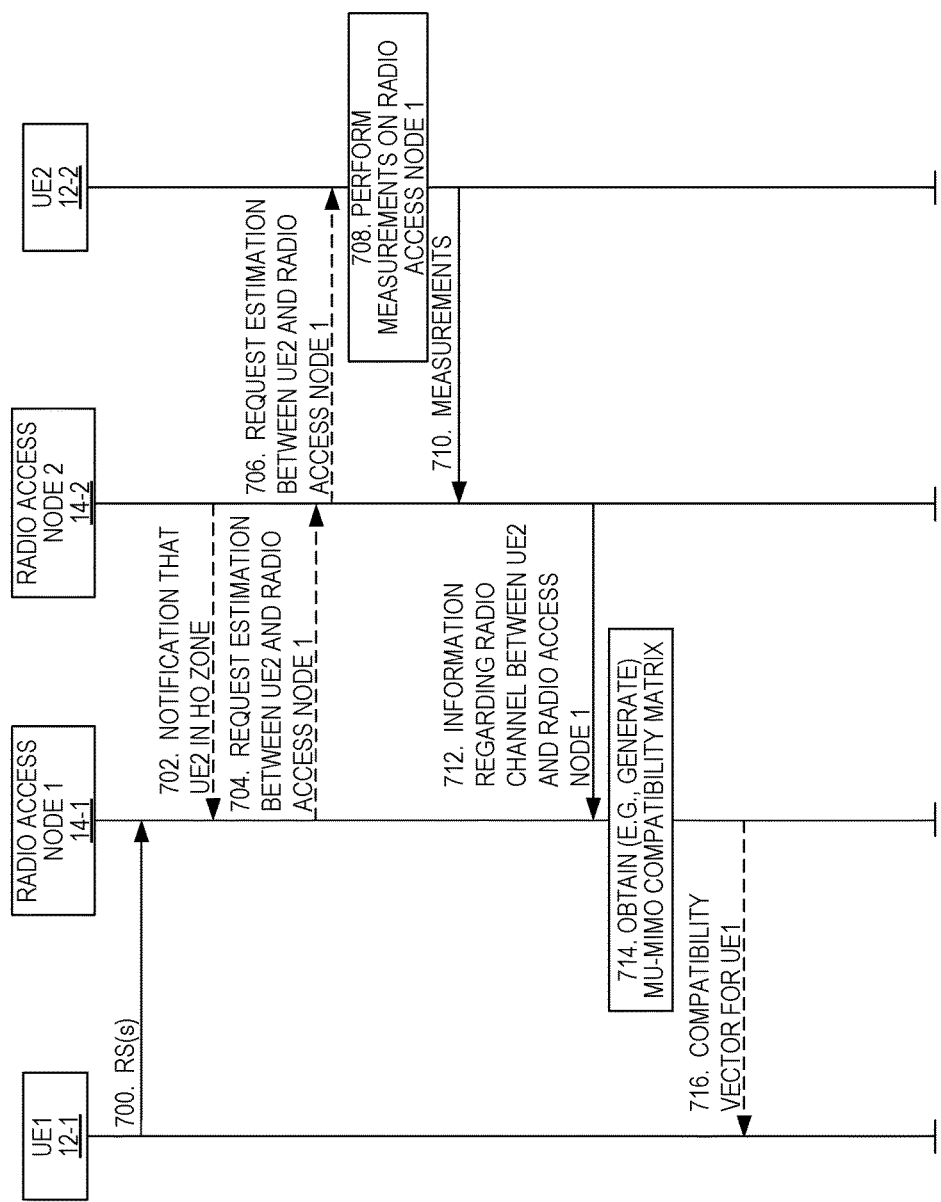
FIGS. 18A and 18B illustrate one particular implementation of the process of FIG. 17 according to some embodiments of the present disclosure.
Figure 18B:
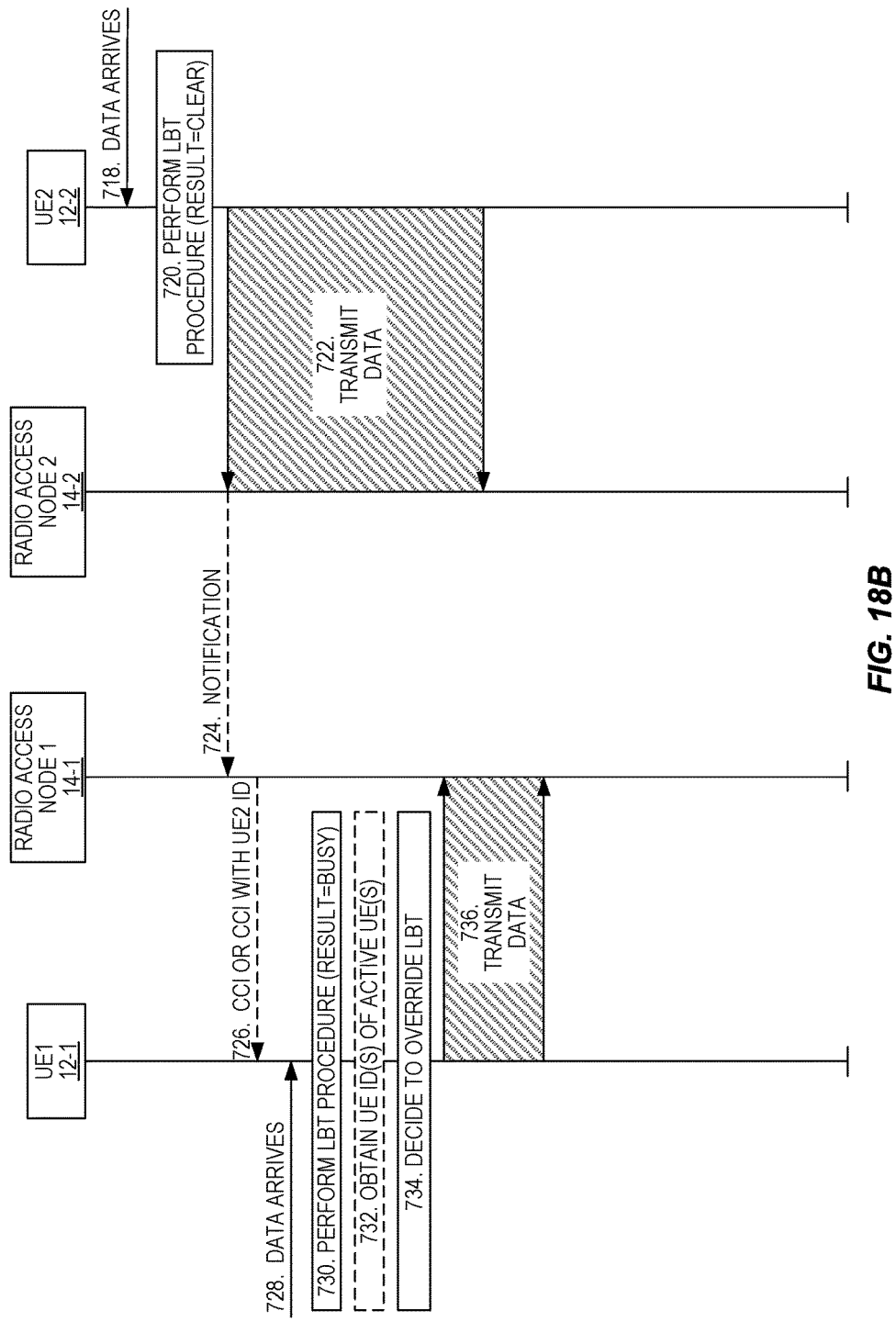

FIGS. 18A and 18B illustrate one particular implementation of the process of FIG. 17 according to some embodiments of the present disclosure. The UE 12-1 transmits a reference signal(s) to the first radio access node 14-1, e.g., as part of a channel estimation process, as described above (step 700). While not illustrated, other UEs 12 also transmit reference signals to their respective serving radio access nodes 14. Optionally (i.e., in some embodiments), the second radio access node 14-2 sends a notification to the first radio access node 14-1 that indicates that the UE 12-2 is in the handover zone between the cells served by the radio access nodes 14-1 and 14-2 (step 702), and the first radio access node 14-1 sends a request to the second radio access node 14-2 for estimation of the radio channel between the UE 12-2 and the first radio access node 14-1 (step 704). Alternatively, in the case of decoded sensing, the UE 12-1 may detect that the UE 12-2 is transmitting and inform the first radio access node 14-1 such that the first radio access node 14-1 sends the request in step 704. The request in step 704 may be, e.g., an explicit request for the second radio access node 14-2 to command the UE 12-2 to measure on the first radio access node 14-1 (e.g., to perform channel estimation for the radio channel between the UE 12-2 and the first radio access node 14-1).

In some embodiments, the second radio access node 14-2 requests that the UE 12-2 estimate the radio channel between the UE 12-2 and the first radio access node 14-1 (step 706). This request may be sent, e.g., upon receiving the request in step 704 or upon determining that the UE 12-2 is in the handover zone between the radio access nodes 14-1 and 14-2. Note that the UE 12-2 may report to the second radio access node 14-2 that it is in the handover zone when the UE 12-2 starts sensing signals transmitted by the first radio access node 14-1 and begins being able to decode reference signals transmitted by the first radio access node 14-1. Either upon request or autonomously (e.g., upon determining that it is in the handover zone), the UE 12-2 performs measurements on the first radio access node 14-1 (step 708). The measurement(s) may include, for example, RSRP or RSRQ measurements. The UE 12-2 reports the measurement(s) to the second radio access node 14-2 (step 710).

The second radio access node 14-2 then provides information to the first radio access node 14-1 regarding the radio channel between the UE 12-2 and the first radio access node 14-1 (step 712). This information may include the measurements reported by the UE 12-2 or information derived from those measurements. Alternatively, as discussed above, the information may include an indication that UE 12-2 is in the handover zone.

Based on the reception of the reference signal(s) from the UE 12-1, the reception of reference signals from additional UEs 12 (not shown in FIGS. 18A and 18B) in the cell served by the first radio access node 14-1, and the information received from the second radio access node 14-2 in step 712, the first radio access node 14-1 obtains a MU-MIMO compatibility matrix (step 714). In some embodiments, measurements or other information regarding the reception of the reference signals as well as the information received from the second radio access node 14-2 regarding the UE 12-2 is provided to another network node, which generates the compatibility matrix and provides the compatibility matrix to the first radio access node 14-1. However, in other embodiments, the first radio access node 14-1 generates and maintains the compatibility matrix based on the reception of the reference signals, the information received from the second radio access node 14-2, and a number of criteria. In this manner, the compatibility matrix is generated to further include an indication of whether UEs 12 in neighboring cells (e.g., the UE 12-2) are compatible with UEs 12 in the cell served by the first radio access node 14-1.

From this point on, the process may proceed according to any of the embodiments described above with respect to FIGS. 9A and 9B through FIGS. 15A and 15B. Specifically, in some embodiments, the first radio access node 14-1 signals the compatibility vector of the UE 12-1 to the UE 12-1 (step 716). As discussed above, the compatibility vector of the UE 12-1 is the entry of the compatibility matrix that defines the UEs 12 that are compatible with the UE 12-1. In this example, the compatible UEs 12 include the UE 12-2 in the neighboring cell.

In the illustrated example, at some point in time, data arrives at the UE 12-2 for transmission (step 718). Before transmission, the UE 12-2 performs an LBT procedure on the channel (step 720). In this example, the result of the LBT procedure is a determination that the channel is clear. As such, the UE 12-2 begins transmitting data on the channel (step 722). Optionally, upon determining that the UE 12-2 is transmitting on the channel, the second radio access node 14-2 sends a respective notification to the first radio access node 14-1 (step 724).

In some embodiments, upon determining that the UE 12-2 is transmitting on the channel either based on the notification received from the second radio access node 14-2 or otherwise, the first radio access node 14-1 transmits a CCI message to at least one of the UEs 12 served by the first radio access node 14-1 that is compatible with the UE 12-2. In this example, by examining the compatibility matrix, the first radio access node 14-1 determines that the UE 12-1 is compatible with the UE 12-2 and, as such, the first radio access node 14-1 transmits a CCI message to the UE 12-1 (step 726). As discussed above, in some embodiments, the CCI message is an indication that the UE 12-1 is permitted to override the LBT procedure. Further, in some embodiments, the CCI message includes the UE IDs compatible UEs 12 for the UE 12-1, which in this example include the UE 12-2.

At some point while the UE 12-2 is transmitting data on the channel, data arrives at the UE 12-1 for transmission (step 728). Before transmitting the data, the UE 12-1 performs an LBT procedure (step 730). In this example, the result of the LBT procedure is a determination that the channel is busy.

As discussed above, in some embodiments, the UE 12-1 obtains the identities (i.e., the UE IDs) of the UE(s) 12 that are transmitting on the channel, which are referred to herein as active UEs (step 732). Notably, while showed as being performed after the LBT procedure, step 732 may be performed prior to, during, or after the LBT procedure. In this example, the UE 12-1 obtains the identity of the UE 12-1 as the UE that is active.

The UE 12-1 decides to override the LBT procedure (step 734). As discussed above, in some embodiments, the UE 12-1 decides to override the LBT procedure based on the CCI message, the compatibility vector of the UE 12-2, and the obtained UE ID(s). In other embodiments, the UE 12-1 decides to override the LBT procedure based on the CCI message which in this case includes the UE ID(s) of the compatible UE(s) for the UE 12-1 and the UE ID(s) obtained in step 732. Still further, in other embodiments, the UE 12-1 decides to override the LBT procedure based on the CCI message. Upon deciding to override the LBT procedure, the UE 12-1 transmits data on the channel (step 736). Note that, in the embodiments in which CCI messages are used, the variations of FIGS. 11 through 14 may be applied.

As described above with respect to FIG. 17 and FIGS. 18A and 18B, the multi-cell case employs radio access node to radio access node message exchanges. In some embodiments, the procedure is as follows. The following example illustrates some particular implementations of the processes of FIG. 17 and FIGS. 18A and 18B.

Each UE 12 sends reference signals to the UE's connected radio access node 14, as in the single cell case.

If the UE 12-2 is in the handover zone between the radio access nodes 14-1 and 14-2, then the UE 12-2 measures the channel between the UE 12-2 and the radio access node 14-1 since, in the handover zone, the UE 12-2 starts sensing and being able to decode reference signals transmitted by the radio access node 14-1. The UE 12-2 can report to its serving radio access node 14-2 that the UE 12-2 is in the handover zone (i.e., "approaching" the radio access node 14-1). In this step, the following actions can also take place:

The radio access node 14-2 can indicate to the radio access node 14-1 that the UE 12-2 is in the handover zone.

The radio access node 14-1 can request explicitly for the radio access node 14-2 to command the UE 12-2 to perform channel estimation between the UE 12-2 and the radio access node 14-1.

In case of decoded sensing, the UE 12-1 knows that the UE 12-2 is transmitting. So, in some embodiments, the UE 12-1 sends a request to the radio access node 14-1 to obtain channel information for the radio channel between the UE 12-2 and the radio access node 14-1.

The radio access node 14-1 can tune the handover margin towards the radio access node 14-2 (i.e., increase the handover zone).

The radio access node 14-2 forwards this information (i.e., the radio access node 14-2 forwards the measurement results of the UE 12-2 on the reference signals of the radio access node 14-1 to the radio access node 14-1).

The radio access node 14-1 constructs the compatibility matrix including an indication of the compatibility between the UEs 12-1 and 12-2.

The UE 12-2 senses the channel and starts transmitting.

The radio access node 14-1 sends a CCI message to the UE 12-1 and the procedure then proceeds as in the single cell case. For example:

For decoded sensing (i.e., when the UE 12-1 is able to determine which UEs 12 are transmitting on the channel), the UE 12-1 determines that the UE 12-2 is transmitting and overrides the LBT procedure based on the CCI message and, in some embodiments, the compatibility vector of the UE 12-1.

For native sensing (i.e., when the UE 12-1 does not determine which UEs 12 are transmitting on the channel), the radio access node 14-2 signals to the radio access node 14-1 that the UE 12-2 is transmitting. The CCI message indicates to the UE 12-1 that the UE 12-1 is permitted to override the LBT procedure, as discussed above.

Figure 19:
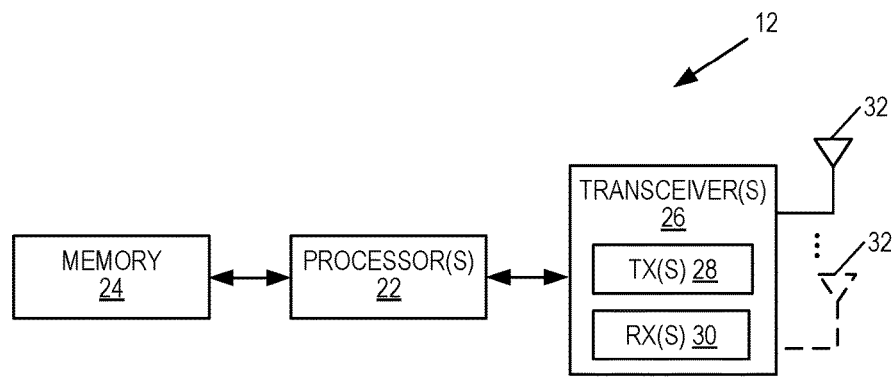
FIGS. 19 and 20 illustrate example embodiments of a UE.

FIG. 19 is a schematic block diagram of a UE 12 according to some embodiments of the present disclosure. As illustrated, the UE 12 includes one or more processors 22 (e.g., Central Processing Units (CPUs), Application Specific Integrated Circuits (ASICs), Field Programmable Gate Arrays (FPGAs), and/or the like), memory 24, and one or more transceivers 26 each including one or more transmitters 28 and one or more receivers 30 coupled to one or more antennas 32. In some embodiments, the functionality of the UE 12 described above may be fully or partially implemented in software that is, e.g., stored in the memory 24 and executed by the processor(s) 22.

In some embodiments, a computer program including instructions which, when executed by at least one processor, causes the at least one processor to carry out the functionality of the UE 12 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
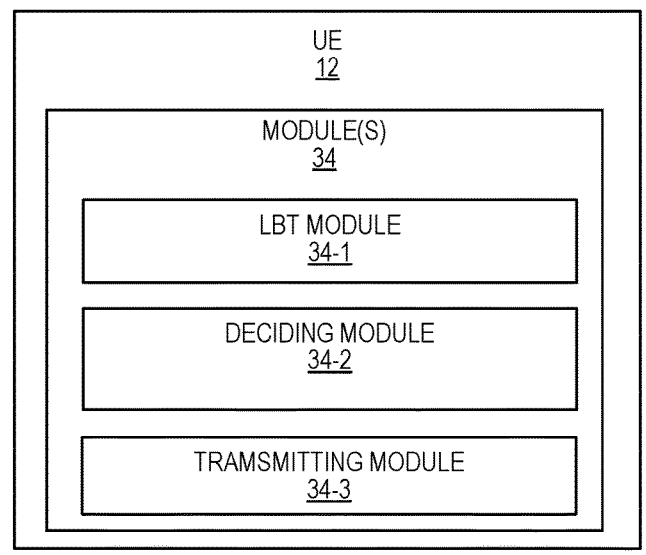

FIG. 20 is a schematic block diagram of the UE 12 according to some other embodiments of the present disclosure. The UE 12 includes one or more modules 34, each of which is implemented in software. The module(s) 34 provide the functionality of the UE 12 described herein. In some embodiments, the module(s) 34 include an LBT module 34-1, a deciding module 34-2, and a transmitting module 34-3. The LBT module 34-1 operates to perform a LBT procedure for an observed channel. The deciding module 34-2 operates to decide whether or not to override the LBT procedure based on knowledge regarding whether the observed channel is busy due to transmission by a compatible UE 12, as described above. The transmitting module 34-3 operates to transmit, via an associated transmitter(s) (not shown) of the UE 12, on the observed channel even if the result of the LBT procedure is that the observed channel is busy upon deciding to override the LBT procedure, as described above.

Figure 21:
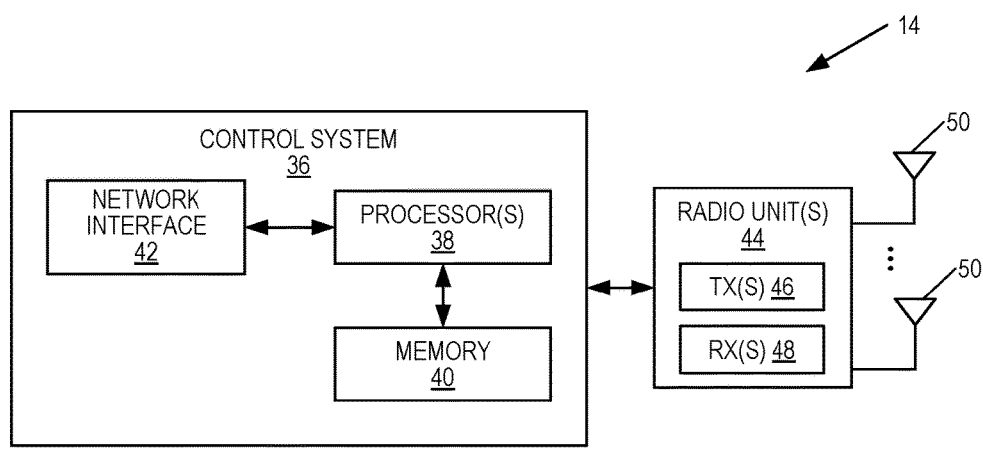
FIGS. 21 through 23 illustrate example embodiments of a radio access node.

FIG. 21 is a schematic block diagram of a radio access node 14 according to some embodiments of the present disclosure. As illustrated, the radio access node 14 includes a control system 36 that includes one or more processors 38 (e.g., CPUs, ASICs, FPGAs, and/or the like), memory 40, and a network interface 42. In addition, the radio access node 14 includes one or more radio units 44 that each includes one or more transmitters 46 and one or more receivers 48 coupled to multiple antennas 50. In some embodiments, the radio unit(s) 44 is external to the control system 36 and connected to the control system 36 via, e.g., a wired connection (e.g., an optical cable). However, in some other embodiments, the radio unit(s) 44 and potentially the antenna(s) 50 are integrated together with the control system 36. The one or more processors 38 operate to provide one or more functions of a radio access node 14 as described herein. In some embodiments, the function(s) are implemented in software that is stored, e.g., in the memory 40 and executed by the one or more processors 38.

Figure 22:
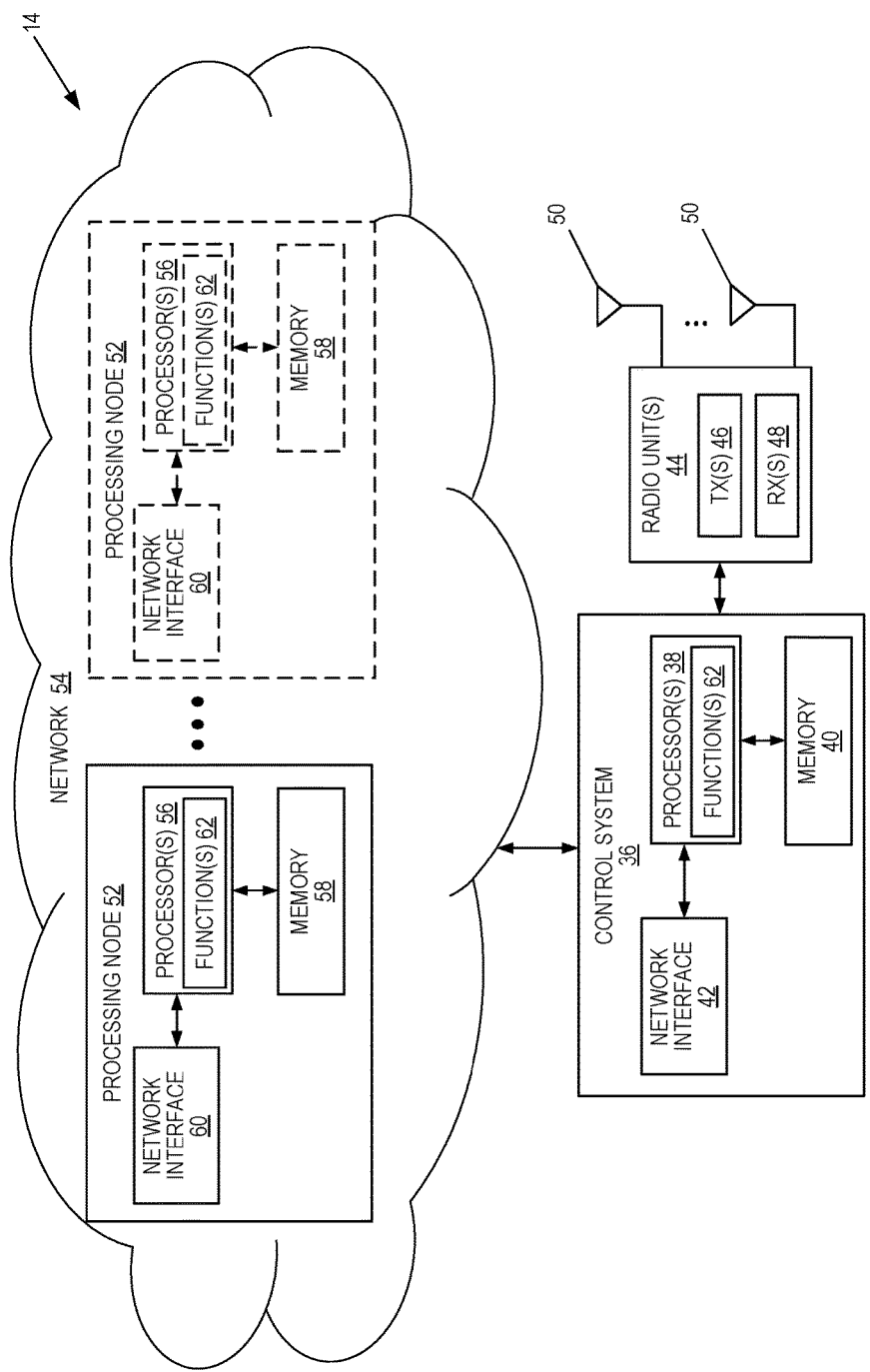

FIG. 22 is a schematic block diagram that illustrates a virtualized embodiment of the radio access node 14 according to some embodiments of the present disclosure. This discussion is equally applicable to other types of network nodes. Further, other types of network nodes may have similar virtualized architectures.

As used herein, a "virtualized" radio access node 14 is an implementation of the radio access node 14 in which at least a portion of the functionality of the radio access node 14 is implemented as a virtual component(s) (e.g., via a virtual machine(s) executing on a physical processing node(s) in a network(s)). As illustrated, in this example, the radio access node 14 includes the control system 36 (optional) that includes the one or more processors 38 (e.g., CPUs, ASICs, FPGAs, and/or the like), the memory 40, and the network interface 42 and the one or more radio units 44 that each includes the one or more transmitters 46 and the one or more receivers 48 coupled to the antennas 50, as described above. The control system 36 is connected to the radio unit(s) 44 via, for example, an optical cable or the like. The control system 36 is connected to one or more processing nodes 52 coupled to or included as part of a network(s) 54 via the network interface 42. Each processing node 52 includes one or more processors 56 (e.g., CPUs, ASICs, FPGAs, and/or the like), memory 58, and a network interface 60.

In this example, functions 62 of the radio access node 14 described herein are implemented at the one or more processing nodes 52 or distributed across the control system 36 and the one or more processing nodes 52 in any desired manner. In some particular embodiments, some or all of the functions 62 of the radio access node 14 described herein are implemented as virtual components executed by one or more virtual machines implemented in a virtual environment(s) hosted by the processing node(s) 52. As will be appreciated by one of ordinary skill in the art, additional signaling or communication between the processing node(s) 52 and the control system 36 is used in order to carry out at least some of the desired functions 62. Notably, in some embodiments, the control system 36 may not be included, in which case the radio unit(s) 44 communicate directly with the processing node(s) 52 via an appropriate network interface(s).

In some embodiments, a computer program including instructions which, when executed by at least one processor, causes the at least one processor to carry out the functionality of a radio access node 14 or a node (e.g., a processing node 52) implementing one or more of the functions 62 of the radio access node 14 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 23:
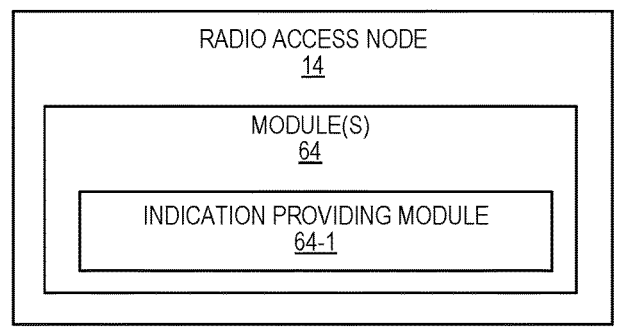

FIG. 23 is a schematic block diagram of the radio access node 14 according to some other embodiments of the present disclosure. The radio access node 14 includes one or more modules 64, each of which is implemented in software. The module(s) 64 provide the functionality of the radio access node 14 described herein. This discussion is equally applicable to the processing node 52 of FIG. 22 where the modules 64 may be implemented at one of the processing nodes 52 or distributed across multiple processing nodes 52 and/or distributed across the processing node(s) 52 and the control system 36. In some embodiments, the module(s) 64 include an indication providing module 64-1 that is operable to provide an indication to a UE 12 where the indication indicates that the UE 12 is permitted to override a LBT procedure for an observed channel, e.g., if the observed channel is busy due to transmission by a compatible UE, as described above.

In general, in some embodiments, the present disclosure relates to making a UE 12 aware of spatial multiplexing capability at a respective radio access node (e.g., base station) such that the UE 12 does not necessarily back off when sensing a channel as being busy during a channel sensing period of an LBT procedure. On the other hand, when spatial (de-) multiplexing capability at the radio access node is utilized, an LBT procedure is useful so that, e.g., no more than a maximum number of UEs 12 actually transmit on a given Physical Resource Block (PRB) or frequency channel.

In some embodiments, the UE 12 is made aware of the spatial multiplexing capability at the radio access node 14 such that the UE 12 does not necessarily back off when sensing that the channel is busy during the channel sensing period of the LBT procedure. On the other hand, when the spatial (de-) multiplexing capability at the radio access node 14 is utilized, an LBT procedure is useful so that no more than a maximum number of users actually use a given PRB or frequency channel.

In some embodiments, the radio access node 14 signals information to UEs 12 that inform the UEs 12 about the current spatial load (possibly per PRB) at the radio access node 14 so that the UEs 12 can autonomously decide, based on the provided information and their own measurements, whether the carrier sensing part of the LBT procedure means a clean or busy channel. Spatial load on a PRB may refer to the number of UEs 12 that are using that PRB. Alternatively, spatial load may refer to the aggregate receive power and/or the number of traffic flows that is received on a PRB by the radio access node 14. Spatial load, in general, describes the sum traffic related activity by multiple UEs 12 on a resource such as a PRB. Thus, the UE 12 can decide whether or not to transmit even when the channel is sensed busy.

This basic idea is enhanced by a power control mechanism that enables the UEs 12 to set their power levels such that the spatial separation (de-multiplexing) of UEs 12 at the radio access node 14 becomes possible.

Systems and methods are disclosed herein that relate to a mechanism at the radio access node(s) 14 and the UEs 12 that enable the UEs 12 to decide whether they can use the wireless channel for data transmission even when it is sensed busy during the listening phase of the LBT procedure. Thus, when spatial multiplexing of MU-MIMO UEs is supported at the radio access node 14, the LBT procedure is made, by means of the embodiments disclosed herein, compatible with spatial domain co-scheduling. The embodiments of the present disclosure, therefore, enable MU-MIMO co-scheduling in unlicensed bands when MU-MIMO technology is deployed in such bands.

The embodiments described herein focus on uplink scenarios. However, the concepts disclosed herein can also be used for the downlink (i.e., used for downlink MIMO systems) where the radio access node 14 applies LBT as a medium access scheme for the MIMO broadcast channel, rather than for the MIMO multiple access channel. Specifically, in the case of a Time Division Duplexing (TDD) system, the radio access node 14 can utilize channel reciprocity and UE measurements as well as its own measurements to determine the compatibility set of the radio access node(s) 14. In the case of Frequency Division Duplexing (FDD), the radio access node 14 can utilize UE measurement reports obtained by means of a suitable feedback channel.

The following acronyms are used throughout this disclosure.

| | |
|---|---|
| μs | Microsecond |
| 2D | Two-Dimensional |
| 3GPP | Third Generation Partnership Project |
| 5G | Fifth Generation |
| AGC | Automatic Gain Control |
| AoA | Angle of Arrival |
| AP | Access Point |
| ASIC | Application Specific Integrated Circuit |
| CA | Carrier Aggregation |
| CC | Component Carrier |
| CCA | Clear Channel Assessment |
| CCI | Channel Clearance Indicator |
| CFI | Control Format Indicator |
| CN | Core Network |
| CPU | Central Processing Unit |
| CRS | Cell Specific Reference Symbol |
| CS | Carrier Sensing |
| CSI | Channel State Information |
| CSIR | Channel State Information at the Receiver |
| CSMA | Carrier Sense Multiple Access |
| CSMA/CA | Carrier Sense Multiple Access with Collision Avoidance |
| DCF | Distributed Coordination Function |
| dBm | Decibel-Milliwatt |
| DFT | Discrete Fourier Transform |
| DIFS | Distributed Inter-Frame Space |
| DMRS | Demodulation Reference Signal |
| EIFS | Extended Inter-Frame Space |
| eNB | Enhanced or Evolved Node B |
| EPDCCH | Enhanced Physical Downlink Control Channel |
| FDD | Frequency Division Duplexing |
| FPGA | Field Programmable Gate Array |
| GHz | Gigahertz |
| ID | Identifier |
| IRC | Interference Rejection Combining |
| LA | License Assisted |
| LAA | License Assisted Access |
| LBT | Listen-Before-Talk |
| LTE | Long Term Evolution |
| LTE-U | Long Term Evolution in Unlicensed Spectrum |
| MAC | Medium Access Control |
| MHz | Megahertz |
| MME | Mobility Management Entity |
| MMSE | Minimum Mean Square Error |
| ms | Millisecond |

-continued

| | |
|---|---|
| MTC | Machine Type Communication |
| MulteFire | Long Term Evolution in Unlicensed Spectrum Forum |
| MU-MIMO | Multiuser Multiple Input Multiple Output |
| OFDM | Orthogonal Frequency Division Duplexing |
| PCell | Primary Cell |
| PDCCH | Physical Downlink Control Channel |
| PDN | Packet Data Network |
| P-GW | Packet Data Network Gateway |
| PRACH | Physical Random Access Channel |
| PRB | Physical Resource Block |
| PSD | Power Spectral Density |
| PUSCH | Physical Uplink Shared Channel |
| Rel | Release |
| RRM | Radio Resource Management |
| RSRP | Reference Signal Received Power |
| RSRQ | Reference Signal Received Quality |
| SCEF | Service Capability Exposure Function |
| SCell | Secondary Cell |
| SIC | Successive Interference Cancellation |
| SIFS | Short Inter-Frame Space |
| SINR | Signal to Interference plus Noise Ratio |
| SRS | Sounding Reference Signal |
| TDD | Time Division Duplexing |
| UE | User Equipment |
| WLAN | Wireless Local Area Network |

Those skilled in the art will recognize improvements and modifications to the embodiments of the present disclosure. All such improvements and modifications are considered within the scope of the concepts disclosed herein and the claims that follow.

What is claimed is:

1. A method of operation of a User Equipment, UE, in a cellular communications network, comprising:
performing a Listen-Before-Talk, LBT, procedure for an observed channel, a result of the LBT procedure being that the observed channel is busy;
receiving an indication of a spatial load of the cellular communications network;
deciding to override the LBT procedure based on knowledge that the observed channel is busy due to transmission by a compatible UE, the compatible UE being a UE that can be co-scheduled with the UE in the cellular communications network and based on the indication of the spatial load of the cellular communications network; and
transmitting on the observed channel even though the result of the LBT procedure is that the observed channel is busy upon deciding to override the LBT procedure.

2. The method of claim 1 further comprising:
receiving, from a radio access node, an indication that the UE is permitted to override the LBT procedure if the observed channel is busy due to transmission by a compatible UE;
wherein deciding to override the LBT procedure comprises deciding to override the LBT procedure based on the indication that the UE is permitted to override the LBT procedure.

3. The method of claim 2 further comprising:
receiving a revocation of the indication that the UE is permitted to override the LBT procedure while transmitting on the observed channel; and
terminating transmission on the observed channel upon receiving the revocation of the indication that the UE is permitted to override the LBT procedure.

4. The method of claim 1 further comprising:
obtaining identities of one or more UEs transmitting on the observed channel;

wherein deciding to override the LBT procedure comprises deciding to override the LBT procedure if the identities of the one or more UEs transmitting on the observed channel are all compatible UEs.

5. The method of claim 1 further comprising:
receiving, from a radio access node, a compatibility vector comprising identities of one or more compatible UEs for the UE;
receiving, from the radio access node, an indication that the UE is permitted to override the LBT procedure if the observed channel is busy due to transmission by a compatible UE as identified in the compatibility vector; and
obtaining identities of one or more UEs transmitting on the observed channel;
wherein deciding to override the LBT procedure comprises deciding to override the LBT procedure based on the indication that the UE is permitted to override the LBT procedure, the compatibility vector, and the identities of the one or more UEs transmitting on the observed channel.

6. The method of claim 5 wherein deciding to override the LBT procedure based on the indication that the UE is permitted to override the LBT procedure, the compatibility vector, and the identities of the one or more UEs transmitting on the observed channel comprises deciding to override the LBT procedure if: (a) the indication that the UE is permitted to override the LBT procedure has been received and (b) the identities of the one or more UEs transmitting on the observed channel are all included in the compatibility vector.

7. The method of claim 1 further comprising:
receiving, from a radio access node, an indication that the UE is permitted to override the LBT procedure if the observed channel is busy due to transmission by one or more compatible UEs and UE identities of the one or more compatible UEs comprised in the indication that the UE is permitted to override the LBT procedure; and
obtaining identities of one or more UEs transmitting on the observed channel;
wherein deciding to override the LBT procedure comprises deciding to override the LBT procedure based on the indication that the UE is permitted to override the LBT procedure and the identities of the one or more UEs transmitting on the observed channel.

8. The method of claim 7 wherein deciding to override the LBT procedure based on the indication that the UE is permitted to override the LBT procedure and the identities of the one or more UEs transmitting on the observed channel comprises deciding to override the LBT procedure if: (a) the indication that the UE is permitted to override the LBT procedure has been received and (b) the identities of the one or more UEs transmitting on the observed channel are all comprised in the indication that the UE is permitted to override the LBT procedure.

9. The method of claim 1 further comprising:
receiving, from a radio access node, a compatibility vector comprising identities of one or more compatible UEs for the UE; and
obtaining identities of one or more UEs transmitting on the observed channel;
wherein deciding to override the LBT procedure comprises deciding to override the LBT procedure based on the compatibility vector and the identities of the one or more UEs transmitting on the observed channel.

10. The method of claim 9 wherein deciding to override the LBT procedure based on the compatibility vector and the identities of the one or more UEs transmitting on the observed channel comprises deciding to override the LBT procedure if the identities of the one or more UEs transmitting on the observed channel are all comprised in the compatibility vector.

11. The method of claim 1 further comprising:
receiving, from a radio access node, an indication that the UE is permitted to override the LBT procedure; and
wherein deciding to override the LBT procedure comprises deciding to override the LBT procedure upon receiving the indication that the UE is permitted to override the LBT procedure.

12. The method of claim 1 wherein the observed channel is in an unlicensed frequency band.

13. A User Equipment, UE, for a cellular communications network, comprising:
at least one transceiver;
at least one processor; and
memory comprising instructions executable by the at least one processor whereby the UE is operable to:
perform a Listen-Before-Talk, LBT, procedure for an observed channel, a result of the LBT procedure being that the observed channel is busy;
receive an indication of a spatial load of the cellular communications network;
decide to override the LBT procedure based on knowledge that the observed channel is busy due to transmission by a compatible UE, the compatible UE being a UE that can be co-scheduled with the UE in the cellular communications network and based on the indication of the spatial load of the cellular communications network; and
transmit on the observed channel even though the result of the LBT procedure is that the observed channel is busy upon deciding to override the LBT procedure.

14. A method of operation of a node in a cellular communications network, comprising:
providing an indication of a spatial load of the cellular communications network and an indication to a User Equipment, UE, where the indication provided to the UE indicates that the UE is permitted to override a Listen-Before-Talk, LBT, procedure for an observed channel if the observed channel is busy due to transmission by a compatible UE, the compatible UE being a UE that can be co-scheduled with the UE in the cellular communications network and based on the indication of the spatial load of the cellular communications network.

15. The method of claim 14 wherein providing the indication that the UE is permitted to override the LBT procedure to the UE comprises:
transmitting a Channel Clearance Indicator, CCI, message to the UE in response to the compatible UE transmitting on the observed channel.

16. The method of claim 14 further comprising:
receiving reference signals from a plurality of UEs comprising the UE; and
generating a compatibility matrix, the capability matrix comprising, for each UE of the plurality of UEs, a compatibility vector that comprises information that indicates which of the other UEs in the plurality of UEs are compatible UEs for that UE; and
sending, to the UE, the compatibility vector for the UE.

17. The method of claim 14 further comprising:
receiving reference signals from a plurality of UEs comprising the UE; and generating a compatibility matrix, the capability matrix comprising, for each UE of the plurality of UEs, a compatibility vector that comprises information that indicates which of the other UEs in the plurality of UEs are compatible UEs for that UE;

wherein providing the indication that the UE is permitted to override the LBT procedure to the UE comprises transmitting a Channel Clearance Indicator, CCI, message to the UE in response to the compatible UE, as determined by the compatibility matrix, transmitting on the observed channel.

18. The method of claim 14 further comprising:

providing the indication that the UE is permitted to override the LBT procedure to a second UE; and revoking the indication that the UE is permitted to override the LBT procedure to the second UE in response to the UE transmitting on the observed channel.

19. The method of claim 18 wherein the second UE is compatible with the compatible UE, and the second UE is not compatible with the UE.

20. The method of claim 18 further comprising revoking the indication that the UE is permitted to override the LBT procedure to the UE while the UE is transmitting.

21. The method of claim 20 further comprising renewing the indication that the UE is permitted to override the LBT procedure to the second UE.

22. The method of claim 14 further comprising providing the indication that the UE is permitted to override the LBT procedure to a second UE once the UE has completed a transmission on the observed channel, wherein the second UE is compatible with the compatible UE, and the second UE is not compatible with the UE.

23. The method of claim 22 further comprising revoking the indication that the UE is permitted to override the LBT procedure to the UE once the UE has completed the transmission on the observed channel.

24. The method of claim 14 further comprising receiving information from a neighboring radio access node in the cellular communications network that indicates that the compatible UE is compatible with the UE, the compatible UE being served by the neighboring radio access node.

25. The method of claim 24 wherein the information received from the neighboring radio access node comprises at least one of a group consisting of: an indication that the compatible UE is in a cell served by the neighboring radio access node, an indication that the compatible UE is in a handover zone between the cell served by the neighboring radio access node and a cell served by the radio access node, and information regarding a radio channel between the radio access node and the compatible UE.

26. A node for a cellular communications network, comprising:

at least one processor; and memory comprising instructions executable by the at least one processor whereby the node is operable to provide an indication of a spatial load of the cellular communications network and an indication to a User Equipment, UE, where the indication provided to the UE indicates that the UE is permitted to override a Listen-Before-Talk, LBT, procedure for an observed channel if the observed channel is busy due to transmission by a compatible UE, the compatible UE being a UE that can be co-scheduled with the UE in the cellular communications network and based on the indication of the spatial load of the cellular communications network.

* * * * *